United States Patent
Natarajan et al.

(10) Patent No.: US 12,504,974 B2
(45) Date of Patent: Dec. 23, 2025

(54) METHODS AND APPARATUS TO SEQUENCE BRANCH OPERATIONS

(71) Applicant: Texas Instruments Incorporated, Dallas, TX (US)

(72) Inventors: Venkatesh Natarajan, Bangalore (IN); Saya Goud Langadi, Sugar Land, TX (US); Alexander Tessarolo, Lindfield (AU)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/587,432

(22) Filed: Feb. 26, 2024

(65) Prior Publication Data

US 2025/0045052 A1 Feb. 6, 2025

Related U.S. Application Data

(60) Provisional application No. 63/517,369, filed on Aug. 3, 2023.

(51) Int. Cl.
G06F 9/30 (2018.01)
G06F 9/38 (2018.01)

(52) U.S. Cl.
CPC ...... G06F 9/30058 (2013.01); G06F 9/30145 (2013.01); G06F 9/3814 (2013.01)

(58) Field of Classification Search
CPC . G06F 9/30058; G06F 9/30145; G06F 9/3814
See application file for complete search history.

(56) References Cited

U.S. PATENT DOCUMENTS

| | | | |
|---|---|---|---|
| 2004/0111592 A1* | 6/2004 | Nagao | G06F 9/3842 712/E9.05 |
| 2010/0058039 A1* | 3/2010 | Angarai | G06F 9/30167 712/241 |
| 2010/0257340 A1* | 10/2010 | Doing | G06F 9/3814 712/215 |
| 2020/0004543 A1* | 1/2020 | Kumar | G06F 9/323 |
| 2022/0058127 A1 | 2/2022 | Heremagalur Ramaprasad et al. | |
| 2022/0308888 A1* | 9/2022 | Park | G06F 9/3814 |

* cited by examiner

*Primary Examiner* — Zachary K Huson
(74) *Attorney, Agent, or Firm* — Xianghui Huang; Frank D. Cimino

(57) ABSTRACT

An example apparatus includes: address generation circuitry configured to generate a first address associated with a first packet, a second address associated with a second packet, and a third address associated with a third packet, wherein: the first packet includes a branch instruction; the branch instruction includes a first field that specifies a branch target, and a second field that is different from the first field; and the third packet includes the branch target of the branch instruction; buffer circuitry configured to receive the first packet, the second packet, and the third packet; decoder circuitry coupled to the buffer circuitry, the decoder circuitry configured to decode the first packet, the second packet, and the third packet; discontinuity controller circuitry coupled to the buffer circuitry and the decoder circuitry and configured to determine whether to cause the address generation circuitry to generate the second address.

20 Claims, 15 Drawing Sheets

330

| ADDRESS | DATA ID | 16 BIT | 16 BIT | 16 BIT | 16 BIT | 16 BIT | 16 BIT | 16 BIT | 16 BIT |
|---|---|---|---|---|---|---|---|---|---|
| \{ 332 \} 0x00 | DATA-0x00 | C3 | | C6 | | C2 | | | C1 |
| \{ 334 \} 0x10 | DATA-0x10 | C4 | | | | | | C3 | |
| \{ 336 \} 0x20 | DATA-0x20 | | | | | | C5 | C4 | |
| ... | ... | ... | ... | ... | ... | ... | ... | ... | ... |
| \{ 338 \} 0x50 | | D1 | | | | | | | |
| \{ 340 \} 0x60 | DATA-0x50 | D2 | | | | | | | |
| \{ 342 \} 0x70 | DATA-0x60 | D3 | | | | | | | |
| \{ 344 \} 0x80 | DATA-0x70 | D4 | | | | | | | |
| \{ 346 \} 0x90 | DATA-0x80 | D5 | | | | | | | |
| \{ 348 \} 0xA0 | DATA-0x90 | D6 | | | | | | | |

MEMORY

| | F1 | F2 | D1 | D2 |
|---|---|---|---|---|
| 352 | 0x00 | | | |
| 354 | 0x10 | DATA-0x00 (332) | | |
| 356 | 0x20 | DATA-0x00 (332)<br>DATA-0x10 (334) | 0x00 | |
| 358 | 0x30 | DATA-0x00 (332)<br>DATA-0x10 (334)<br>DATA-0x20 (336) | 0x02 | C1 |
| 360 | | DATA-0x00 (332)<br>DATA-0x10 (334)<br>DATA-0x20 (336)<br>DATA-0x30 | 0x08 | C2 |
| 362 | | DATA-0x00 (332)<br>DATA-0x10 (334)<br>DATA-0x20 (336)<br>DATA-0x30 | 0x0C | C6 (B BRANCH_NAME) |
| 364 | 0x50 | DATA-0x10 (334)<br>DATA-0x20 (336)<br>DATA-0x30 | 0x12 | C3 |
| 366 | 0x60 | DATA-0x20 (336)<br>DATA-0x30<br>DATA-0x50 (338) | 0x22 | C4 |
| 368 | 0x70 | DATA-0x20 (336)<br>DATA-0x30<br>DATA-0x50 (338)<br>DATA-0x60 (340) | 0x50 | C5 |
| 370 | 0x80 | DATA-0x60 (340)<br>DATA-0x70 (342) | 0x60 | D1 |
| 372 | 0x90 | DATA-0x70 (342)<br>DATA-0x80 (344) | 0x70 | D2 |

FIG. 3C

| | F1 | F2 | D1 | D2 |
|---|---|---|---|---|
| 428 | 0x00 | | | |
| 430 | 0x10 | DATA-0x00 (420) | | |
| 432 | 0x20 | DATA-0x00 (420)<br>DATA-0x10 (422) | 0x00 | |
| 434 | 0x30 | DATA-0x00 (420)<br>DATA-0x10 (422)<br>DATA-0x20 (424) | 0x02 | C1 |
| 436 | | DATA-0x00 (420)<br>DATA-0x10 (422)<br>DATA-0x20 (424)<br>DATA-0x30 | 0x08 | C2 |
| 438 | | DATA-0x00 (420)<br>DATA-0x10 (422)<br>DATA-0x20 (424)<br>DATA-0x30 | 0x0C | C6 (B LOOP_START) |
| 440 | 0x00 | DATA-0x10 (422)<br>DATA-0x20 (424)<br>DATA-0x30 | 0x12 | C3 |
| 442 | 0x10 | DATA-0x20 (424)<br>DATA-0x30<br>DATA-0x00 (420) | 0x22 | C4 |
| 444 | 0x20 | DATA-0x00 (420)<br>DATA-0x10 (422) | 0x00 | C5 |
| 446 | 0x30 | DATA-0x00 (420)<br>DATA-0x10 (422)<br>DATA-0x20 (424) | 0x02 | C1 |
| 448 | | DATA-0x00 (420)<br>DATA-0x10 (422)<br>DATA-0x20 (424)<br>DATA-0x30 | 0x08 | C2 |
| 450 | | DATA-0x00 (420)<br>DATA-0x10 (422)<br>DATA-0x20 (424)<br>DATA-0x30 | 0x0C | C6 (B LOOP_START) |
| 452 | 0x10 | DATA-0x10 (422)<br>DATA-0x20 (424)<br>DATA-0x30 | 0x12 | C3 |

FIG. 4C

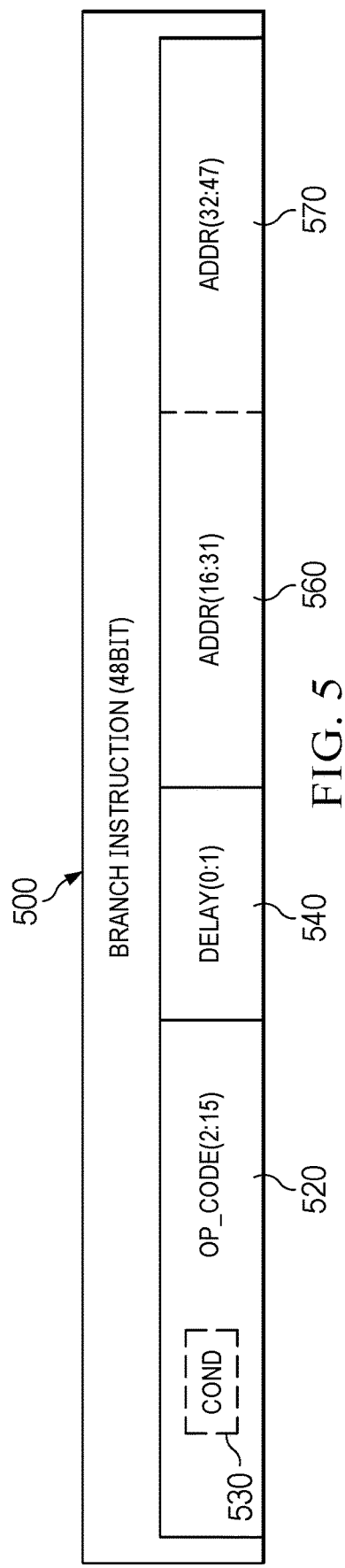

METHODS AND APPARATUS TO SEQUENCE BRANCH OPERATIONS

CROSS-REFERENCE TO RELATED APPLICATION

This patent application claims the benefit of and priority to U.S. Provisional Patent Application Ser. No. 63/517,369 filed Aug. 3, 2023, which is hereby incorporated herein by reference in its entirety.

TECHNICAL FIELD

This description relates generally to processing instructions and, more particularly, to methods and apparatus to sequence branch operations.

BACKGROUND

As electronics continue to advance, processing speeds and complexities of programmable circuitry continue to increase. Some designers are developing increasingly complex programmable circuitry designs to increase processing speeds and complexity of each operation. Process improvements in the execution of machine instructions further improve processing speeds and allow for increasing complex instructions. As programmable circuitry becomes increasingly common, designers are incentivized to develop circuitry capable of efficiently executing machine instructions.

SUMMARY

For methods and apparatus to sequence branch operations, an example apparatus includes address generation circuitry configured to generate a first address associated with a first packet, a second address associated with a second packet, and a third address associated with a third packet, wherein: the first packet includes a branch instruction; the branch instruction includes a first field that specifies a branch target, and a second field that is different from the first field; and the third packet includes the branch target of the branch instruction; buffer circuitry configured to receive the first packet, the second packet, and the third packet; decoder circuitry coupled to the buffer circuitry, the decoder circuitry configured to decode the first packet, the second packet, and the third packet; discontinuity controller circuitry coupled to the buffer circuitry and the decoder circuitry and configured to determine whether to cause the address generation circuitry to generate the second address based on the second field of the branch instruction; and execution circuitry coupled to the decoder circuitry, the execution circuitry configured to determine whether to cause the address generation circuitry to generate the third address based on the branch instruction.

BRIEF DESCRIPTION OF THE DRAWINGS

FIG. 3B illustrates an example placement of instructions of the list of machine-readable instructions of FIG. 3A in the example memory of FIGS. 1 and 2, wherein the instructions are placed based on the order of execution of FIG. 3A.

FIG. 3C illustrates example operations of the programmable circuitry of FIG. 2 to execute the list of machine-readable instructions of FIGS. 3A and 3B using the order of execution of FIG. 3A.

FIG. 4C illustrates example operations of the programmable circuitry of FIG. 2 to execute the list of machine-readable instructions of FIGS. 4A and 4B using the order of execution of FIG. 4A.

FIG. 5 is an illustration of an example branch instruction format including delay bits.

The same reference numbers or other reference designators are used in the drawings to designate the same or similar (functionally and/or structurally) features.

DETAILED DESCRIPTION

Figure 1:
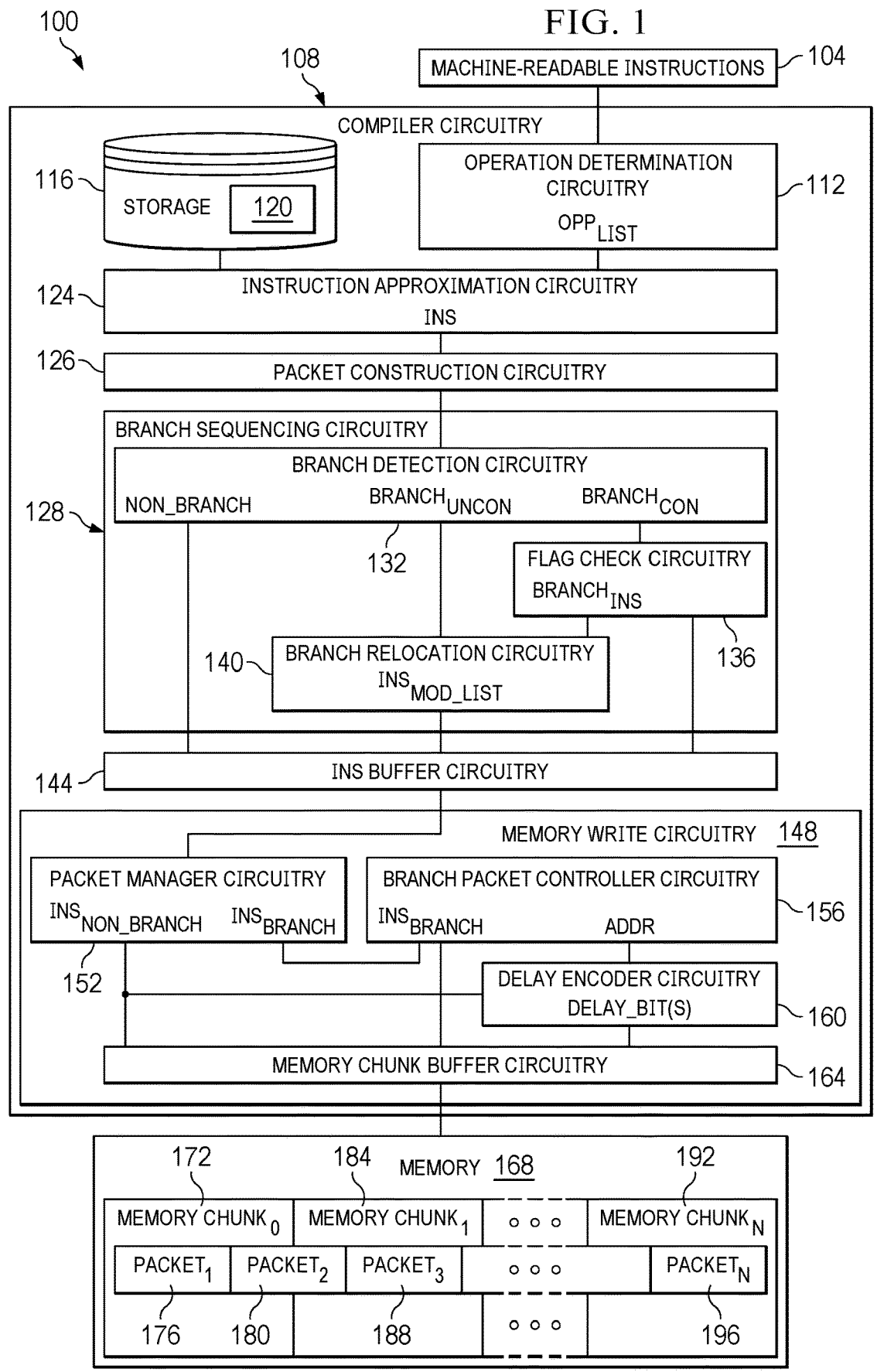
FIG. 1 is a block diagram of example compiler circuitry that generates a list of machine-readable instructions responsive to a relatively high-level abstraction of operations, wherein the compiler circuitry is to reorder branch instructions in an example memory.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

As electronics continue to advance, processing speeds and complexities of programmable circuitry continue to increase. Some designers are developing increasingly complex programmable circuitry designs to increase processing speeds and complexity of each operation. Process improvements in the execution of machine instructions further improve processing speeds and allow for increasing complex instructions. As programmable circuitry becomes increasingly common, designers are incentivized to develop circuitry capable of efficiently executing machine instructions.

Programmable circuitry (e.g., a central processing unit) implements a pipeline to execute machine instructions. The instructions may be grouped into packets, and in some examples, the instructions in a packet are executed in parallel. The pipeline uses circuitry to fetch, decode, and execute the machine instructions in the packets. In some examples, the pipeline fetches memory chunks, decodes instruction packets contained in the memory chunks, and executes machine instructions of the instruction packets. The programmable circuitry cycles each machine instruction through the pipeline one step at a time based on cycles of a cycle clock. The period of the cycle clock determines the duration of time that each stage of the pipeline has available to perform an operation.

In operation, a first fetch stage generates and supplies a read command to the memory, while a second fetch stage receives and stores a memory chunk. In such examples, a first decode stage decodes the memory chunk to determine an instruction packet, while a second decode stage executes a machine instruction of the decoded instruction packet. In some example operations, such as read operations and write operations, additional stages perform operations to execute additional memory operations. To execute a machine instruction, the machine instruction individually progresses through the pipeline of the programmable circuitry. Accordingly, the programmable circuitry typically utilizes a plurality of cycles to request, receive, and decode machine instruction prior to executing machine instructions. For example, a given instruction may be requested from memory, received from the memory in the form of an instruction packet, and decoded from the instruction packet prior to being available for execution. In such examples, each operation of the pipeline occurs in reference to cycle(s) of the cycle clock.

During a first cycle, the programmable circuitry supplies a read command to read a first memory chunk containing one or more instruction packets. During a second cycle, the programmable circuitry causes the first memory chunk to be stored in an instruction buffer, internal to the programmable circuitry. Also, during the second cycle, the programmable circuitry may supply another read command specifying a second memory chunk. During a third cycle, the programmable circuitry decodes the first memory chunk extract, from the first memory chunk, an instruction packet having at least one machine instruction available for execution. Also, during the third cycle, the memory may store a third memory chunk in the instruction buffer, by supplying yet another read command to the memory. During a fourth cycle, the programmable circuitry causes circuitry to perform the operation of the machine instruction of the first memory chunk. Such an operation of circuitry to perform an operation may be referred to as execution of the machine instruction. After the fourth cycle, the programmable circuitry continues to fetch, decode, and execute instruction packets from the memory.

However, when a machine instruction is a branch instruction, the machine instruction specifies a memory chunk to read from the memory. In such examples, the programmable circuitry may fetch and decode instruction packets from the memory chunks specified by the branch instruction. Assuming the branch is taken, during cycles when the programmable circuitry is fetching and decoding the instruction packets specified by the target of the branch instruction, the programmable circuitry fails to execute any instructions because the instruction packets of the branch target are progressing through stages of the pipeline.

Examples described herein include methods and apparatus to sequence branch operations. In some described examples, compiler circuitry adjusts an order of execution of machine instructions to preemptively call branch instructions so that the branch instructions are performed out of order. In example operation, programmable circuitry preforms operations to begin executing instructions from a location specified by a branch instruction while continuing to execute instructions. In some examples, the compiler circuitry adjusts the order of execution of packets of machine instructions that were originally to be executed prior to an execution of the branch instruction. By advancing an execution of the packet with the branch and delaying execution of other packets, programmable circuitry executes the delayed packets of machine instructions while fetching one or more memory chunks and decoding corresponding packets of machine instructions from the memory chunks at a branch location. The exact number of packets to delay in order to advance the branch may depend on properties (e.g., pipeline depth, number of fetch and/or decode cycle) of a programmable device that will execute the compiled instructions, and each programmable device may have a unique reference number that represents the optimal number of packets that may rearranged to follow the packet containing the branch instruction. Advantageously, delaying an execution of packets allows the programmable circuitry to fetch and decode instructions at the branch location and continue to execute instructions.

The compiler circuitry reorders the selected packets to be after the branch instruction. During example operations, programmable circuitry executes the machine instructions of the selected packets after beginning the execution of the branch instruction, while fetching and decoding the memory chunks specified by the branch instruction. In such examples, the programmable circuitry uses a first instruction buffer to continue to execute machine instructions, while using a second instruction buffer to begin storing memory chunks specified by the branch instruction. While the last of the delayed packets of determined machine instructions are being executed, the programmable circuitry begins to decode memory chunks from the second instruction buffer.

Advantageously, placing the packets of machine instructions after the branch instruction allows programmable circuitry to continue to execute machine instructions, while fetching and decoding the machine instructions of the branch instruction. Advantageously, preemptively executing the branch instructions reduces a number of cycles where the programmable circuitry is not executing a machine instruction. Advantageously, using a plurality of instruction buffers allows the programmable circuitry to continue to execute machine instructions, while machine instructions at a branch location are cycling through the pipeline. Advantageously, such sequencing allows compiler circuitry to reduce cycles where no operations are being executed for call operations (e.g., a call instruction), call-return operations (e.g., a return instruction), loop operations, etc.

FIG. 1 is a block diagram of an example assembler system 100. In the example of FIG. 1, the assembler system 100 includes example machine-readable instructions 104, example compiler circuitry 108, example operation determination circuitry 112, example storage 116, example processor specific instructions 120, example instruction approximation circuitry 124, example packet construction circuitry 126, example branch sequencing circuitry 128, example branch detection circuitry 132, example flag check circuitry 136, example branch relocation circuitry 140, example instruction buffer circuitry 144, example memory write circuitry 148, example packet manager circuitry 152, example branch packet controller circuitry 156, example delay encoder circuitry 160, example memory chunk buffer circuitry 164, an example memory 168, a first example memory chunk 172, a first example instruction packet 176, a second example instruction packet 180, a second example memory chunk 184, a third example instruction packet 188, a third example memory chunk 192, and a fourth example instruction packet 196. The assembler system 100 assembles a list of the instruction packets 176, 180, 188, 196 that represent the machine-readable instructions 104. The assembler system 100 stores the list of instruction packets 176, 180, 188, 196 in the memory 168 for execution at a later time.

Figure 2:
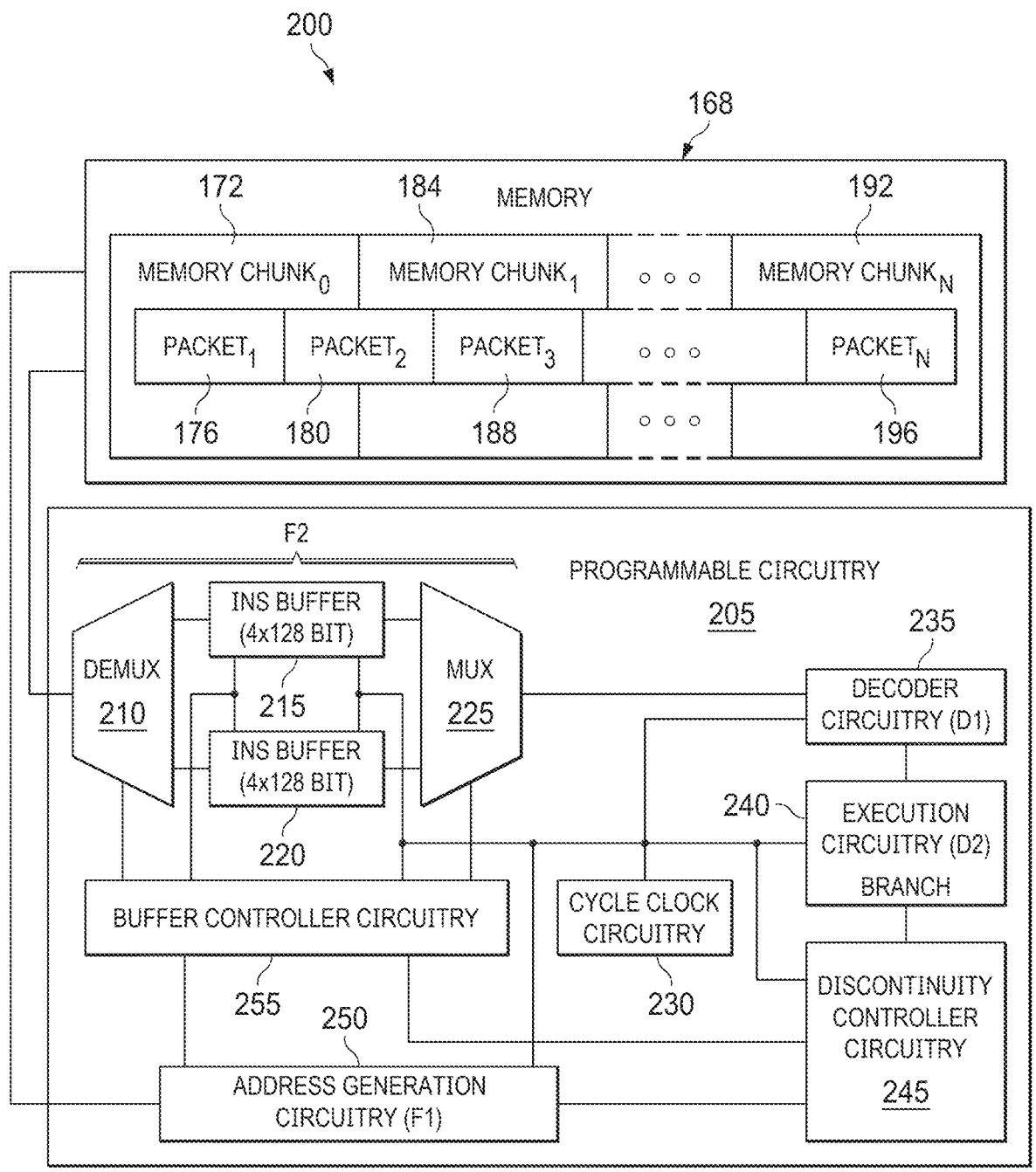
FIG. 2 is a block diagram of an example device including programmable circuitry that executes instructions of the list of machine-readable instructions of FIG. 1 from the memory of FIG. 1, wherein the programmable circuitry is to preemptively execute branch instructions.

The machine-readable instructions 104 form a list of operations that define desired functions of programmable circuitry (illustrated in FIG. 2). In some examples, the machine-readable instructions 104 are defined using a programming language, such as C, C++, C#, etc. In such examples, designers may create the machine-readable instructions 104 using the programming language to define operations to be performed. For example, developing and/or debugging a code to perform operations that, when compiled, may be referred to as software. However, such operations, as defined in the machine-readable instructions 104, represent general functions of programmable circuitry. In order to implement the machine-readable instructions 104 using programmable circuitry, the machine-readable instructions 104 are converted to machine instructions, which are specific to the programmable circuitry.

Machine instructions are operational values that configure the programmable circuitry to instantiate circuitry, which performs a predefined operation. The programmable circuitry performs the operations of the machine-readable instructions 104 responsive to sequentially executing a plurality of machine instructions that represent the machine-readable instructions 104. In some examples, a machine instruction has an opcode and/or an operand, which form an operational value, which configures the programmable circuitry. When configured, the programmable circuitry instantiates circuitry to perform an operation that corresponds to the opcode and/or operand of the machine instruction. In such examples, designers often use assembly language to represent the machine instructions that are specific to programmable circuitry. The compiler circuitry 108 converts the machine-readable instructions 104 to the machine instructions capable of being executed by programmable circuitry at a later time.

In the example of FIG. 1, the block diagram is of an example implementation of the compiler circuitry 108 of FIG. 1, which converts the machine-readable instructions 104 into instruction packets in the memory 168. In some examples, an instruction packet is one or more machine instructions and may include additional bits, which correspond to one or more additional operations, such as delay operations. The compiler circuitry 108 may be instantiated (e.g., creating an instance of, bring into being for any length of time, materialize, implement, etc.) by programmable circuitry such as a Central Processor Unit (CPU) executing first instructions. Additionally or alternatively, compiler circuitry 108 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the compiler circuitry 108 may, thus, be instantiated at the same or different times. Some or all of compiler circuitry 108 may be instantiated, for example, in one or more threads executing concurrently on hardware and/or in series on hardware. Moreover, in some examples, some or all of compiler circuitry 108 may be implemented by microprocessor circuitry executing instructions and/or FPGA circuitry performing operations to implement one or more virtual machines and/or containers.

The compiler circuitry 108 receives the machine-readable instructions 104. In the example of FIG. 1, the compiler circuitry 108 includes the operation determination circuitry 112, the storage 116, the processor specific instructions 120, the instruction approximation circuitry 124, the branch sequencing circuitry 128, the branch detection circuitry 132, the flag check circuitry 136, the branch relocation circuitry 140, the instruction buffer circuitry 144, the memory write circuitry 148, the packet manager circuitry 152, the branch packet controller circuitry 156, the delay encoder circuitry 160, and the memory chunk buffer circuitry 164. The compiler circuitry 108 generates a list of machine instructions that, when executed, implement the operations of the machine-readable instructions 104. The compiler circuitry 108 encodes additional data, such as delay information, onto machine instructions to form instruction packets. The compiler circuitry 108 reorders instruction packets in the list of instructions to preemptively execute branch operations. In some examples, the compiler circuitry 108 encodes delays into the reordered branch instructions based on a location of the reordered instruction packets in one or more chunks of the memory 168. The compiler circuitry 108 writes the instruction packets 176, 180, 188, 196 to the memory 168.

The operation determination circuitry 112 receives the machine-readable instructions 104. In some examples, the operation determination circuitry 112 accesses the machine-readable instructions 104 at a memory address. In such examples, the operation determination circuitry 112 may be coupled to a storage device corresponding to the memory address. In other examples, an operating system supplies the machine-readable instructions 104 to the operation determination circuitry 112. In such examples, the operation determination circuitry 112 may be coupled to programmable circuitry executing instructions of the operating system. The operation determination circuitry 112 determines operations ($OPP_{LIST}$) of the machine-readable instructions 104 responsive to receiving the machine-readable instructions 104. The operation determination circuitry 112 sequentially lists operations that programmable circuitry will use to perform to implement the machine-readable instructions 104.

In some examples, the operation determination circuitry 112 approximates relatively complex operations of the machine-readable instructions 104 to one or more relatively less complex operations that programmable circuitry may perform. In such examples, the operation determination circuitry 112 may analyze the machine-readable instructions 104 to determine an order of execution. When the operations are executed using the order of execution, programmable circuitry instantiates circuitry to perform operations of the machine-readable instructions 104. The operation determination circuitry 112 supplies the determined operations to the instruction approximation circuitry 124. In some examples, the operation determination circuitry 112 is instantiated by programmable circuitry executing operation determination instructions and/or configured to perform operations such as those represented by the flowchart of FIG. 6.

The storage 116 is coupled to the instruction approximation circuitry 124. In the example of FIG. 1, the storage 116 includes the processor specific instructions 120. In such examples, the storage 116 is a form volatile or non-volatile memory capable of storing data. The processor specific instructions 120 are a plurality of instructions that correspond to a specific instance of programmable circuitry, such as a specific version of an ARM core processor. Each instruction of the processor specific instructions 120 corresponds to an operation of the programmable circuitry. For example, a first instruction of the processor specific instructions 120 may correspond to a load operation, while a second instruction of the processor specific instructions 120 may correspond to an add operation. In such examples, the first instruction may be referred to as a load instruction, while the second instruction may be referred to as an add instruction.

The instruction approximation circuitry 124 is coupled to the operation determination circuitry 112, the storage 116, and the packet construction circuitry 126. The instruction approximation circuitry 124 receives the operations, which represent the machine-readable instructions 104, from the operation determination circuitry 112. The instruction approximation circuitry 124 accesses the processor specific instructions 120. The instruction approximation circuitry 124 compares operations from the operation determination circuitry 112 to the processor specific instructions 120. The instruction approximation circuitry 124 generates machine instructions (INS) responsive to the comparison. Similar to the determined operations, the instruction approximation circuitry 124 sequentially generates machine instructions representing operations of the programmable circuitry to implement the machine-readable instructions 104. In some examples, the instruction approximation circuitry 124 receives an operation from the operation determination circuitry 112. In such examples, the instruction approximation circuitry 124 selects an instruction of the processor specific instructions 120 that corresponds to the operation.

In example operation, the instruction approximation circuitry 124 determines an operation code (opcode) for each instruction responsive to a comparison of the operation to the processor specific instructions 120. In some examples, the instruction approximation circuitry 124 combines the opcode and an operand to form a machine instruction. In such examples, the operand specifies a location of and/or values of data used to perform the operation of the opcode. For example, an addition instruction includes an opcode, which identifies an addition operation to occur, and one or more operand(s), which specifies register values to add and/or a location to store a result. The instruction approximation circuitry 124 assembles the machine instructions using the processor specific instructions 120. The instruction approximation circuitry 124 supplies the machine instructions to the packet construction circuitry 126. In some examples, the instruction approximation circuitry 124 is instantiated by programmable circuitry executing instruction approximation instructions and/or configured to perform operations such as those represented by the flowchart of FIG. 6.

The packet construction circuitry 126 is coupled to the instruction approximation circuitry 124, the branch sequencing circuitry 128, and the branch detection circuitry 132. The packet construction circuitry 126 receives machine instructions from the instruction approximation circuitry 124. The packet construction circuitry 126 converts the machine instructions into instruction packets by grouping the machine instructions and/or encoding additional data onto the machine instructions. In some examples, the packet construction circuitry 126 adds a plurality of machine instructions into a single instruction packet. In such examples, the additional data of the instruction packet corresponds to the plurality of machine instructions. An instruction packet represents data to be fetched by the programmable circuitry during run time. In some examples, the packet construction circuitry 126 encodes data that may be used by decode stages of a pipeline for execution by programmable circuitry. For example, the packet construction circuitry 126 may include delay bits that define delay operations of the programmable circuitry. The packet construction circuitry 126 supplies the instruction packets, which include one or more machine instructions, to the branch sequencing circuitry 128.

The branch sequencing circuitry 128 is coupled to the packet construction circuitry 126 and the instruction buffer circuitry 144. The branch sequencing circuitry 128 receives the machine instructions from the packet construction circuitry 126. In the example of FIG. 1, the branch sequencing circuitry 128 includes the branch detection circuitry 132, the flag check circuitry 136, and the branch relocation circuitry 140. The branch sequencing circuitry 128 adjusts the order of execution of the instruction packets to reorder branch instructions. Advantageously, reordering branch instructions reduces the number of cycles of the programmable circuitry where no machine instruction is being executed, while instruction packets of the branch are being fetched and decoded.

The branch detection circuitry 132 is coupled to the instruction approximation circuitry 124, the flag check circuitry 136, the branch relocation circuitry 140, and the instruction buffer circuitry 144. The branch detection circuitry 132 receives the instruction packets from the instruction approximation circuitry 124. The branch detection circuitry 132 checks each of the instruction packets to determine whether an instruction packet includes a branch instruction. A branch instruction within an instruction packet that may create an address discontinuity while fetching machine instructions from the memory 168. Branch instructions, when executed, adjust the flow of operations by modifying a program counter and/or a memory address of fetching subsequent instruction packets of programmable circuitry. Such a modification to the memory address of fetch operations is considered an address discontinuity. For example, the operation determination circuitry 112 may represent a function call of the machine-readable instructions 104 using a branch operation. In such an example, the instruction approximation circuitry 124 selects an opcode of a branch instruction to represent the branch operation.

In some examples, the branch detection circuitry 132 may determine an instruction packet includes a branch instruction responsive to the opcode. In such examples, when the opcode specifies the operation of the machine instruction as a branch operation, the branch detection circuitry 132 determines the instruction that includes the opcode to be a branch instruction. When the instruction packet does not include a branch instruction, the branch detection circuitry 132 supplies the non-branch instruction packets to the instruction buffer circuitry 144.

When the instruction packet includes a branch instruction, the branch detection circuitry 132 determines whether the branch instruction is one of a conditional branch instruction or an unconditional branch instruction. A conditional branch instruction is a branch instruction that occurs based on a condition of a flag at a time of execution. A flag is an indication set by a prior to execution of machine instructions. For example, the operation determination circuitry 112 may represent a conditional function call of the machine-readable instructions 104 as a conditional branch operation. In such an example, the instruction approximation circuitry 124 selects an opcode representing a conditional branch operation. When the branch instruction is a conditional branch instruction, the branch detection circuitry 132 supplies the conditional machine instruction to the flag check circuitry 136.

An unconditional branch instruction is a branch instruction that occurs no matter what machine instructions are performed prior to execution of the unconditional branch instruction. For example, the operation determination circuitry 112 may represent an unconditional function call of the machine-readable instructions 104 as an unconditional branch operation. In such an example, the instruction approximation circuitry 124 selects an opcode representing an unconditional branch operation. When the branch instruction is an unconditional branch instruction, the branch detection circuitry 132 supplies the unconditional machine instruction to the branch relocation circuitry 140. In some examples, the branch detection circuitry 132 is instantiated by programmable circuitry executing branch detection circuitry instructions and/or configured to perform operations such as those represented by the flowchart of FIG. 6.

The flag check circuitry 136 is coupled to the branch detection circuitry 132, the branch relocation circuitry 140 and the instruction buffer circuitry 144. The flag check circuitry 136 receives conditional branch instructions from the branch detection circuitry 132. The flag check circuitry 136 determines one or more flags on which the conditional branch instruction depends. In some examples, the flag check circuitry 136 determines the one or more flags based on the opcode of the conditional branch instruction. In such examples, the opcode identifies the one or more flags that are conditional to the branch operation.

The flag check circuitry 136 reads the machine instructions in the instruction buffer circuitry 144. In the example of FIG. 1, the flag check circuitry 136 determines whether any of the instruction packets that precede the branch instruction and could be moved after the branch instruction may adjust (e.g., set, clear) the one or more flags of the conditional machine instruction. When any of the determined preceding non-branch instructions may adjust the one or more flags, it may not be possible to advance the branch instruction ahead of these instructions. However, the flag check circuitry 136 may still cause the branch instruction to be advanced ahead of other instructions that do not affect the branch outcome.

For pipeline management, flag check circuitry 136 may insert one or more no operation (NoOp) instructions in the instruction buffer circuitry 144. A no operation instruction is a machine instruction that delays the execution of a subsequent machine instruction by a single execution cycle of the programmable circuitry. The flag check circuitry 136 adds the one or more no operation instruction packets after the instruction that is capable of setting the flag to ensure a reference number of instruction packets follow the branch instruction when reordered. The flag check circuitry 136 determines the number of no operation instruction packets to order after the instruction packet containing the machine instruction capable of setting the flag responsive to which instruction packet of the reference number of instruction packets prior to the branch instruction may adjust the one or more flags.

In example operations, when the instruction packet immediately prior to the original order of the branch instruction is capable of adjusting the one or more flags, the flag check circuitry 136 adds the reference number of no operation instruction packets to the instruction buffer circuitry 144. For example, when the programmable circuitry executes three instructions following a branch instruction and a machine instruction, which was originally positioned immediately prior to the branch instruction, is capable of setting a flag of the branch instruction, the flag check circuitry 136 adds three no operation instruction packets after the instruction packet of the determined instruction and/or the branch instruction. In some examples, the flag check circuitry 136 adds the three no operation instruction packets after the branch instruction. In such examples, the branch instruction does not need to be reordered. In other examples, the flag check circuitry 136 adds the three no operation instruction packets after the instruction packet of the determined instruction. In such examples, the branch instruction is reordered to execute after the determined instruction and before the added instruction packets. When the branch instruction is reordered, the added no operation instruction packets are executed following the branch instruction. Advantageously, adding the no operation instruction packets allows the branch instruction to be reordered by the reference number of instruction packets despite instructions capable of adjusting flags.

In another example operation, when the instruction packet within the reference number of instruction packets prior to the branch instruction is capable of adjusting the one or more flags, the flag check circuitry 136 adds at least one no operation instruction packets after the determined instruction packet. In some examples, the flag check circuitry 136 adds the one or more no operation instruction packets after the branch instruction. In such examples, the branch instruction does is reordered by the reference number of packets minus the number of added no operation instruction packets. In other examples, the flag check circuitry 136 adds the one or more no operation instruction packets after the instruction packet of the determined instruction. In such examples, the branch instruction is reordered by the reference number of instruction packets to execute after the determined instruction. The flag check circuitry 136 supplies the conditional branch instruction to the branch relocation circuitry 140 after adding any no operation instruction packets. In some examples, the flag check circuitry 136 is instantiated by programmable circuitry executing flag check instructions and/or configured to perform operations such as those represented by the flowchart of FIG. 7.

The branch relocation circuitry 140 is coupled to the branch detection circuitry 132, the flag check circuitry 136, and the instruction buffer circuitry 144. The branch relocation circuitry 140 receives branch instructions from the branch detection circuitry 132 and/or the flag check circuitry 136. The branch relocation circuitry 140 adjusts the order of execution of the machine instructions in the instruction buffer circuitry 144. The branch relocation circuitry 140 reorders the branch instruction to occur prior to the reference number of instruction packets prior to the original location of the branch instruction. For example, when the reference number of instruction packets is three, the branch relocation circuitry 140 places the branch instruction between the fourth and third most recent instruction packets of the instruction buffer circuitry 144. In such an example, the reordered branch instruction will execute before the reordered instruction packets. Advantageously, executing the delayed instructions after the branch instruction allows the programmable circuitry to fetch and decode machine instructions at a branch target location. In some examples, the branch relocation circuitry 140 is instantiated by programmable circuitry executing branch relocation instructions and/or configured to perform operations such as those represented by the flowchart of FIG. 6.

The instruction buffer circuitry 144 is coupled to the branch detection circuitry 132, the flag check circuitry 136, the branch relocation circuitry 140, the memory write circuitry 148, and the packet manager circuitry 152. The instruction buffer circuitry 144 receives instruction packets. The instruction buffer circuitry 144 sequentially buffers the instruction packets from the branch detection circuitry 132 and the flag check circuitry 136. The branch relocation circuitry 140 relocates the most recently received instructions to adjust the order of execution of the machine instructions to accommodate for a branch instruction. In the adjusted order of execution, the branch instruction is executed the reference number of instruction packets earlier than in the original order of execution. In some examples, the instruction buffer circuitry 144 is a first in first out (FIFO) buffer. The instruction buffer circuitry 144 supplies the instruction packets to the memory write circuitry 148 and the packet manager circuitry 152. In some examples, the instruction buffer circuitry 144 is instantiated by programmable circuitry executing instruction buffer instructions and/or configured to perform operations such as those represented by the flowchart of FIG. 6.

The memory write circuitry 148 is coupled to the instruction buffer circuitry 144 and the memory 168. The memory write circuitry 148 receives the instruction packets from the instruction buffer circuitry 144. In the example of FIG. 1, the memory write circuitry 148 includes the packet manager circuitry 152, the branch packet controller circuitry 156, the delay encoder circuitry 160, and the memory chunk buffer circuitry 164. The memory write circuitry 148 encodes additional data, such as delay information, onto the instruction packets. In some examples, the memory write circuitry 148 encodes delay information into branch instruction packets. The memory write circuitry 148 stores the instruction packets in the memory 168 as memory chunks.

The packet manager circuitry 152 is coupled to the instruction buffer circuitry 144, the branch packet controller circuitry 156, the delay encoder circuitry 160, and the memory chunk buffer circuitry 164. The packet manager circuitry 152 receives the instruction packets from the instruction buffer circuitry 144.

The packet manager circuitry 152 determines whether the instruction packet is a branch instruction packet or a non-branch instruction packet. Similar to the branch detection circuitry 132, the packet manager circuitry 152 may determine whether an instruction packet includes a branch instruction responsive to the opcode of the machine instruction. When the instruction packet is a branch instruction packet, the packet manager circuitry 152 supplies the branch instruction packet to the branch packet controller circuitry 156. When the instruction packet is a non-branch instruction packet, the packet manager circuitry 152 supplies the non-branch instruction packet to the memory chunk buffer circuitry 164. In some examples, the packet manager circuitry 152 is instantiated by programmable circuitry executing packet manager instructions and/or configured to perform operations such as those represented by the flowchart of FIG. 7.

The branch packet controller circuitry 156 is coupled to the packet manager circuitry 152, the delay encoder circuitry 160, and the memory chunk buffer circuitry 164. The branch packet controller circuitry 156 receives branch instruction packets from the packet manager circuitry 152. The branch packet controller circuitry 156 adds delay bits to the branch instruction packet. Such an addition may be referred to as encoding delay information into the branch instruction packet. Because the sizes of packets and the alignment of the packets may vary, the number of chunks fetched to return a given number of packets may vary. Accordingly, the delay bits specify a number of memory chunks to be fetched to execute the reference number of instruction packets following the branch instruction packet. The branch packet controller circuitry 156 supplies the branch instruction packet to the memory chunk buffer circuitry 164. The branch packet controller circuitry 156 tracks a location of the branch instruction packet in the memory chunk buffer circuitry 164. In some examples, the branch packet controller circuitry 156 tracks a memory address of the start bit of the branch instruction packet. The branch packet controller circuitry 156 supplies the location of the branch instruction packet in the memory chunk buffer circuitry 164 to the delay encoder circuitry 160. In some examples, the branch packet controller circuitry 156 is instantiated by programmable circuitry executing branch controller instructions and/or configured to perform operations such as those represented by the flowchart of FIG. 7.

The delay encoder circuitry 160 is coupled to the packet manager circuitry 152, the branch packet controller circuitry 156, and the memory chunk buffer circuitry 164. The delay encoder circuitry 160 receives the location of the branch instruction packet in the memory chunk buffer circuitry 164. The delay encoder circuitry 160 determines the length of the reference number of instruction packets following the branch instruction packet. The delay encoder circuitry 160 determines a number of memory chunks that store the reference number of instruction packets following the branch instruction based on the determined length and the location of the branch instruction packet.

When the branch instruction packet and the reference number of instruction packets following the branch instruction packet are to be stored in the same memory chunk, the delay encoder circuitry 160 leaves the delay bits of the branch instruction packet at a default value (e.g., 0x0). In such examples, the default value corresponds to all of the reference number of instruction packets following the branch instruction packet will be fetched prior to and/or during execution of the branch instruction. However, when the branch instruction packet and the reference number of instruction packets following the branch instruction packet are not stored in the same memory chunk, the delay encoder circuitry 160 modifies the delay bits of the branch instruction packet.

When the branch instruction packet and the reference number of instruction packets following the branch instruction packet are stored in two memory chunks, the delay encoder circuitry 160 sets the delay bits of the branch instruction packet to a first value (e.g., 0x1). The delay encoder circuitry 160 configures the delay bits to fetch two memory chunks after the chunk associated with the branch instruction. When the branch instruction packet and the reference number of instruction packets following the branch instruction packet are stored in three memory chunks, the delay encoder circuitry 160 sets the delay bits of the branch instruction packet to a second value (e.g., 0x2). The delay encoder circuitry 160 configures the delay bits to the second value to fetch three memory chunks after executing the branch instruction. When the branch instruction packet and the reference number of instruction packets following the branch instruction packet are stored in four memory chunks, the delay encoder circuitry 160 sets the delay bits of the branch instruction packet to a third value (0x3). The delay encoder circuitry 160 configures the delay bits to the third value to fetch four memory chunks after executing the branch instruction. In some examples, the delay encoder circuitry 160 is instantiated by programmable circuitry executing delay encoder instructions and/or configured to perform operations such as those represented by the flowchart of FIG. 7.

The memory chunk buffer circuitry 164 is coupled to the packet manager circuitry 152, the branch packet controller circuitry 156, the delay encoder circuitry 160, and the memory 168. The memory chunk buffer circuitry 164 receives instruction packets. The memory chunk buffer circuitry 164 buffers the instruction packets from the packet manager circuitry 152 and the branch packet controller circuitry 156. The memory chunk buffer circuitry 164 receives delay bits from the delay encoder circuitry 160. The memory chunk buffer circuitry 164 allows the delay encoder circuitry 160 to set the delay bits of the branch instruction packets. In some examples, the memory chunk buffer circuitry 164 is a first in first out (FIFO) buffer. The memory chunk buffer circuitry 164 stores the instruction packets in the memory 168. In some examples, the memory chunk buffer circuitry 164 is instantiated by programmable circuitry executing memory chunk buffer instructions and/or configured to perform operations such as those represented by the flowchart of FIG. 7.

The example memory 168 is coupled to the memory chunk buffer circuitry 164. The memory 168 receives instruction packets from the memory chunk buffer circuitry 164. In the example of FIG. 1, the memory 168 includes the memory chunks 172, 184, 192 and the instruction packets 176, 180, 188, 196. The memory chunks 172, 184, 192 are fixed portions of the memory 168. The memory 168 stores the instruction packets from the memory chunk buffer circuitry 164 in one or more of the memory chunks 172, 184, 192. In some examples, the memory 168 is non-volatile memory.

At a first time, the memory 168 receives the first instruction packet 176. At the first time, the memory 168 stores the first instruction packet 176 in the first memory chunk 172. At a second time, following the first time, the memory 168 receives the second instruction packet 180. At the second time, the memory 168 begins to store the second instruction packet 180 after the first instruction packet 176 in the first memory chunk 172. However, the second instruction packet 180 has a length longer than available portions of the first memory chunk 172. In such examples, the memory 168 stores a portion of the second instruction packet 180 in the first memory chunk 172 and a second portion of the second instruction packet 180 in the second memory chunk 184.

At a third time, following the second time, the memory 168 receives the third instruction packet 188. At the third time, the memory 168 stores the third instruction packet 188 after the second instruction packet 180 in the second memory chunk 184. The memory chunk buffer circuitry 164 continues to subsequently write instruction packets to the memory 168 until the fourth instruction packet 196 is written to the third memory chunk 192. Although in the example of FIG. 1, only the memory chunks 172, 184, 192 and the instruction packets 176, 180, 188, 196 are shown, the memory 168 may, in accordance with this description, include any number of memory chunks and/or instruction packets.

FIG. 2 is a block diagram of an example device 200. In the example of FIG. 2, the device 200 includes the memory 168 of FIG. 1, the memory chunks 172, 184, 192 of FIG. 1, the instruction packets 176, 180, 188, 196 of FIG. 1, and example programmable circuitry 205. The device 200 performs operations of the machine-readable instructions 104 of FIG. 1 responsive to the programmable circuitry 205 executing the machine instructions of the instruction packets 176, 180, 188, 196.

The programmable circuitry 205 is coupled to the memory 168. In the example of FIG. 2, the programmable circuitry 205 includes example demultiplexer circuitry 210, first example instruction buffer circuitry 215, second example instruction buffer circuitry 220, example multiplexer circuitry 225, example cycle clock circuitry 230, example decoder circuitry 235, example execution circuitry 240, example discontinuity controller circuitry 245, example address generation circuitry 250, and example buffer controller circuitry 255. The programmable circuitry 205 reads the memory chunks 172, 184, 192 from the memory 168. The programmable circuitry 205 decodes and executes the machine instructions of the instruction packets 176, 180, 188, 196. The programmable circuitry 205 stores one or more of the memory chunks 172 in one of the first or second instruction buffer circuitry 215, 220 based on the execution of the machine instructions.

The address generation circuitry 250 may include a program counter and may be configured to provide an address to the memory 168 according to the program counter. This in turn, may cause the memory 168 to provide a memory chunk to the demultiplexer circuitry 210. The demultiplexer circuitry 210 is coupled to the memory 168, the instruction buffer circuitry 215, 220, and the buffer controller circuitry 255. The memory 168 supplies one of the memory chunks 172, 184, 192 to the demultiplexer circuitry 210 responsive to a read command from the address generation circuitry 250. The buffer controller circuitry 255 controls the demultiplexer circuitry 210. The demultiplexer circuitry 210 supplies the one of the memory chunks 172, 184, 192 to one of the instruction buffer circuitry 215, 220 responsive to the buffer controller circuitry 255. In a first configuration, the demultiplexer circuitry 210 supplies the one of the memory chunks 172, 184, 192 to the first instruction buffer circuitry 215. In a second configuration, the demultiplexer circuitry 210 supplies the one of the memory chunks 172, 184, 192 to the second instruction buffer circuitry 220.

The first instruction buffer circuitry 215 is coupled to the multiplexer circuitry 210, 225, the cycle clock circuitry 230, and the buffer controller circuitry 255. The first instruction buffer circuitry 215 receives a cycle clock signal from the cycle clock circuitry 230. When the demultiplexer circuitry 210 is in the first configuration, the first instruction buffer circuitry 215 receives the one of the memory chunks 172, 184, 192. The first instruction buffer circuitry 215 is configured to store one or more of the memory chunks 172, 184, 192. The first instruction buffer circuitry 215 buffers the one of the memory chunks 172, 184, 192. The first instruction buffer circuitry 215 has a capacity to buffer a plurality of the memory chunks 172, 184, 192. In some examples, when the first instruction buffer circuitry 215 is approximately five-hundred and twelve bits and each of the memory chunks 172, 184, 192 are one-hundred and twenty-eight bits, the first instruction buffer circuitry 215 may store up to four chunks of the memory 168.

When the first instruction buffer circuitry 215 has capacity to store another one of the memory chunks 172, 184, 192, the first instruction buffer circuitry 215 accepts a read response from the memory 168 with a subsequent one of the memory chunks 172, 184, 192. When the first instruction buffer circuitry 215 is full, the buffer controller circuitry 255 determines that the first instruction buffer circuitry 215 no longer has capacity to store another one of the memory chunks 172, 184, 192. Such a determination allows the buffer controller circuitry 255 to delay subsequent read commands to the memory 168. In some examples, the first instruction buffer circuitry 215 is a FIFO buffer. The first instruction buffer circuitry 215 supplies the buffered memory chunks to the multiplexer circuitry 225.

The second instruction buffer circuitry 220 is coupled to the multiplexer circuitry 210, 225, the cycle clock circuitry 230, and the buffer controller circuitry 255. The second instruction buffer circuitry 220 receives the cycle clock signal from the cycle clock circuitry 230. When the demultiplexer circuitry 210 is in the second configuration, the second instruction buffer circuitry 220 receives the one of the memory chunks 172, 184, 192. The second instruction buffer circuitry 220 is configured to store one or more of the memory chunks 172, 184, 192. The second instruction buffer circuitry 220 buffers the one of the memory chunks 172, 184, 192. The second instruction buffer circuitry 220 has a capacity to buffer a plurality of the memory chunks 172, 184, 192. In some examples, when second instruction buffer circuitry 220 is approximately five-hundred and twelve bits and each of the memory chunks 172, 184, 192 are one-hundred and twenty-eight bits, the second instruction buffer circuitry 220 may store up to four chunks of the memory 168.

When the second instruction buffer circuitry 220 has capacity to store another one of the memory chunks 172, 184, 192, the second instruction buffer circuitry 220 may accept a read response from the memory 168 with a subsequent one of the memory chunks 172, 184, 192. When the second instruction buffer circuitry 220 is full, the buffer controller circuitry 255 determines that the second instruction buffer circuitry 220 no longer has capacity to store another one of the memory chunks 172, 184, 192. Such a determination allows the buffer controller circuitry 255 to delay subsequent read commands to the memory 168. In some examples, the second instruction buffer circuitry 220 is a FIFO buffer. The second instruction buffer circuitry 220 supplies the buffered memory chunks to the multiplexer circuitry 225.

The multiplexer circuitry 225 is coupled to the instruction buffer circuitry 215, 220, the decoder circuitry 235, and the buffer controller circuitry 255. The buffer controller circuitry 255 controls the multiplexer circuitry 225. The multiplexer circuitry 225 couples one of the instruction buffer circuitry 215, 220 to the decoder circuitry 235 responsive to the buffer controller circuitry 255. In a first configuration, the multiplexer circuitry 225 couples the first instruction buffer circuitry 215 to the decoder circuitry 235. In a second configuration, the multiplexer circuitry 225 couples the second instruction buffer circuitry 220 to the decoder circuitry 235.

The cycle clock circuitry 230 is coupled to the instruction buffer circuitry 215, 220, the decoder circuitry 235, the execution circuitry 240, and the discontinuity controller circuitry 245. The cycle clock circuitry 230 generates a cycle clock of a predetermined frequency. In some examples, one or more components of the cycle clock circuitry 230 are external to the device 200. For example, when the cycle clock circuitry 230 uses crystal oscillator circuitry, a crystal component of the crystal oscillator circuitry may be external to the device 200 to reduce electro-magnetic interference (EMI). The cycle clock circuitry 230 supplies the cycle clock to the instruction buffer circuitry 215, 220, the decoder circuitry 235, the execution circuitry 240, and the discontinuity controller circuitry 245.

The decoder circuitry 235 is coupled to the multiplexer circuitry 225, the cycle clock circuitry 230, and the execution circuitry 240. The decoder circuitry 235 is configured to decode chunks of memory in one of the first or second instruction buffer circuitry 215, 220 to determine the machine instructions of one of the instruction packets 176, 180, 188, 196. In some examples, the decoder circuitry 235 may be configured to decode packets from one of the memory chunks 172, 184, 192. In such examples, the decoder circuitry 235 sequentially decodes one the plurality of instruction packets for each cycle of the cycle clock. The decoder circuitry 235 removes memory chunks from the first or second instruction buffer circuitry 215, 220 responsive to decoding all instruction packets of the memory chunk. For example, the decoder circuitry 235 may remove the first memory chunk 172 from the first instruction buffer circuitry 215 responsive to decoding both of the instruction packets 176, 180. In such an example, the decoder circuitry 235 decodes the first instruction packet 176 during a first cycle and the second instruction packet 180 during a second cycle. The decoder circuitry 235 supplies the decoded instruction packet to the execution circuitry 240 responsive to another cycle of the cycle clock.

The execution circuitry 240 is coupled to the cycle clock circuitry 230, the decoder circuitry 235 and the discontinuity controller circuitry 245. In some examples, the execution circuitry 240 may be coupled to one or more additional components, such as read circuitry, secondary execution circuitry, etc. The execution circuitry 240 receives a decoded instruction packet from the decoder circuitry 235. When the machine instruction of the decoded instruction packet is a non-branch instruction, the execution circuitry 240 instantiates circuitry to perform the operations of the decoded instruction packet. In such examples, the execution circuitry 240 may instantiate circuitry to execute the operations of the decoded instruction packet every cycle of the cycle clock. When the machine instruction of the decoded instruction packet is a branch instruction, the execution circuitry 240 supplies the decoded instruction to the discontinuity controller circuitry 245. For example, when the execution circuitry 240 determines the opcode of the machine instruction of the decoded instruction packet corresponds to a branch instruction, the execution circuitry 240 supplies the decoded instruction to the discontinuity controller circuitry 245. In some examples, the execution circuitry 240 instantiates the discontinuity controller circuitry 245 responsive to machine instruction being a branch instruction. In such examples, the execution circuitry 240 determines that the branch instruction is one of an unconditional branch instruction or a conditional branch instruction and to be executed (e.g., the condition is met).

The discontinuity controller circuitry 245 is coupled to the cycle clock circuitry 230, the execution circuitry 240, the address generation circuitry 250, and the buffer controller circuitry 255. The discontinuity controller circuitry 245 receives the branch instruction packet and the cycle clock. The discontinuity controller circuitry 245 determines delay information and a branch target address responsive to the branch instruction packet. The discontinuity controller circuitry 245 determines the delay information responsive to the delay bits of the branch instruction packet. The delay information specifies a number of memory chunks that are to be fetched from a current address prior to fetching from the branch target address location. The branch target address location is a memory address in the memory 168 that identifies a subsequent instruction packet.

As noted above, some instructions that would come before the branch instruction if executed in order may be delayed beginning after the branch instruction itself has begun. In example operation, the discontinuity controller circuitry 245 determines a number of subsequent ones of the memory chunks 172, 184, 192 to decode and execute the reference number (e.g., three) of instruction packets that have been reordered to follow the branch instruction based on the delay information. For example, the delay information may specify that one, two, three, or four additional memory chunks are needed. In such examples, the specified additional memory chunks may not include the current one of the memory chunks 172, 184, 192 that the decoder circuitry 235 is decoding from. In such example operations, the discontinuity controller circuitry 245 receives an active buffer fill indication from the buffer controller circuitry 255 specifying a number of memory chunks currently in the one of the instruction buffer circuitry 215, 220 coupled to the decoder circuitry 235. The discontinuity controller circuitry 245 determines a remaining number of memory chunks to be read from the memory 168 prior to reading from the branch target address.

The discontinuity controller circuitry 245 is configured to delay supplying the branch target address to the address generation circuitry 250 for use in adjusting the program counter based on the remaining number of memory chunks to be read from the memory 168. For example, when the delay information specifies three memory chunks, while the first instruction buffer circuitry 215 has two memory chunks, the discontinuity controller circuitry 245 waits an additional cycle of the cycle clock before supplying the branch target address to the address generation circuitry 250. In such an example, the discontinuity controller circuitry 245 determines a first one of the additional memory chunks are in the first instruction buffer circuitry 215, while the address generation circuitry 250 supplies a first read command for a second one of the additional memory chunks during the current cycle to the memory 168. During the additional cycle, the memory 168 provides the second one of the additional memory chunks to the first instruction buffer circuitry 215 and the address generation circuitry 250 generates a second read command for a third one of the additional memory chunks. Advantageously, the discontinuity controller circuitry 245 allows the address generation circuitry 250 to generate read commands for the memory chunks for the reference number of instruction packets following the branch instruction packet by delaying the supply of the branch target address to the address generation circuitry 250.

The discontinuity controller circuitry 245 monitors the buffer controller circuitry 255 to determine when the additional memory chunks are in the one of the instruction buffer circuitry 215, 220 coupled to the decoder circuitry 235. When the discontinuity controller circuitry 245 determines that the additional memory chunks are in the one of the instruction buffer circuitry 215, 220, the discontinuity controller circuitry 245 generates a delay complete indication. The discontinuity controller circuitry 245 supplies the delay complete indication to the buffer controller circuitry 255.

The address generation circuitry 250 is coupled to the cycle clock circuitry 230, the discontinuity controller circuitry 245, and the buffer controller circuitry 255. The address generation circuitry 250 receives the cycle clock, the branch target address, and buffer status indication. The address generation circuitry 250 receives the buffer status indication from the buffer controller circuitry 255. The buffer status indication specifies whether the one of the instruction buffer circuitry 215, 220 are coupled to the memory 168 are full. The one of the instruction buffer circuitry 215, 220 are considered to be full when the available memory of the one of the instruction buffer circuitry 215, 220 is less than a size of a memory chunk.

The address generation circuitry 250 generates read commands including a memory address of one of the memory chunks 172, 184, 192. The address generation circuitry 250 supplies the read commands to the memory 168. The memory 168 provides the one of the memory chunks 172, 184, 192 at the memory address of the read command to one of the instruction buffer circuitry 215, 220. In example operation, the configuration of the demultiplexer circuitry 210 determines which of the instruction buffer circuitry 215, 220 are supplied the one of the memory chunks 172, 184, 192. Such example operations are referred to as a fetch operation. A fetch operation occurs across two cycles of the cycle clock. During a first cycle of the cycle clock, the address generation circuitry 250 generates and supplies a read command to the memory 168. During a second cycle of the cycle clock, following the first cycle, the memory 168 provides one of the memory chunks 172, 184, 192 to one of the instruction buffer circuitry 215, 220.

The address generation circuitry 250 determines a subsequent memory address of a subsequent read command by incrementing the memory address of the previous read command. In some examples, the address generation circuitry 250 increments the memory address of the previous read command by predetermined address increment. In such examples, the determined memory address may be a data identifier, which specifies a location in the memory 168 specific to the data to be read. In other examples, the address generation circuitry 250 increments the memory address of the previous read command by a length of a memory chunk. In such examples, the determined memory address identifies a start bit of the data to be read.

The address generation circuitry 250 discontinues incrementing subsequent memory addresses for read commands responsive to receiving a branch target address. In example operations, the discontinuity controller circuitry 245 delays supplying the branch target address to the address generation circuitry 250 for use in adjusting the program counter based on the delay information. During the next cycle of the cycle clock, the address generation circuitry 250 generates a read command with the branch target address as the memory address. The address generation circuitry 250 resumes incrementing memory addresses of previous read commands responsive to supplying the read command with the branch target address. For example, the address generation circuitry 250 determines the subsequent memory address by incrementing the branch target address. Advantageously, the address generation circuitry 250 begins fetching instructions at the branch target address responsive receiving to the branch target address from the discontinuity controller circuitry 245.

However, the address generation circuitry 250 delays generating and supplying read commands responsive to the buffer status indication indicating that the one of the instruction buffer circuitry 215, 220 coupled to the memory 168 are full. In some examples, the address generation circuitry 250 checks the buffer status indication prior to supplying a read command to the memory 168. When the one of the instruction buffer circuitry 215, 220 are full, the memory 168 may corrupt memory chunks stored in the one of the instruction buffer circuitry 215, 220 by attempting to write another one of the memory chunks 172, 184, 192. The address generation circuitry 250 resumes supplying and generating read commands responsive to the buffer status indication identifying the one of the instruction buffer circuitry 215, 220 are available to receive one or more additional ones of the memory chunks 172, 184, 192.

The buffer controller circuitry 255 is coupled to the multiplexer circuitry 210, 225, the instruction buffer circuitry 215, 220, the discontinuity controller circuitry 245, and the address generation circuitry 250. The buffer controller circuitry 255 receives the delay complete indication from the discontinuity controller circuitry 245.

The buffer controller circuitry 255 controls the multiplexer circuitry 210, 225 based on the delay complete indication. For example, at startup, the buffer controller circuitry 255 adjusts the multiplexer circuitry 210, 225 to couple the first instruction buffer circuitry 215 to the memory 168 and the decoder circuitry 235. The buffer controller circuitry 255 determines the amount of available memory capacity in the instruction buffer circuitry 215, 220. The buffer controller circuitry 255 generates the active buffer fill indication responsive to the amount of available memory in the one of the instruction buffer circuitry 215, 220 coupled to the decoder circuitry 235. The buffer controller circuitry 255 supplies the active buffer fill indication to the discontinuity controller circuitry 245. The buffer controller circuitry 255 generates the buffer status indication responsive to the amount of available memory in the one of the instruction buffer circuitry 215, 220 coupled to the memory 168. The buffer controller circuitry 255 supplies the buffer status indication to the address generation circuitry 250.

The buffer controller circuitry 255 receives the delay complete indication from the discontinuity controller circuitry 245. The buffer controller circuitry 255 adjusts the demultiplexer circuitry 210 to switch which one of the instruction buffer circuitry 215, 220 are coupled to the memory 168. For example, the demultiplexer circuitry 210 switches from coupling the first instruction buffer circuitry 215 to the memory 168 to coupling the second instruction buffer circuitry 220 to the memory 168 responsive to the buffer controller circuitry 255 receiving the delay complete indication. In such an example, during the next cycle of the cycle clock, the memory 168 begins to write memory chunks to the second instruction buffer circuitry 220.

The buffer controller circuitry 255 adjusts the multiplexer circuitry 225 to switch which one of the instruction buffer circuitry 215, 220 are coupled to the decoder circuitry 235 approximately one cycle of the cycle clock after switching the demultiplexer circuitry 210. For example, the multiplexer circuitry 225 switches from coupling the first instruction buffer circuitry 215 to the decoder circuitry 235 to coupling the second instruction buffer circuitry 220 to the decoder circuitry 235 one cycle after adjusting the demultiplexer circuitry 210. In such an example, during the next cycle of the cycle clock, the decoder circuitry 235 begins decoding memory chunks in the second instruction buffer circuitry 220.

Advantageously, the buffer controller circuitry 255 allows the decoder circuitry 235 to continue to decode memory chunks in the first instruction buffer circuitry 215, while the memory writes memory chunks, at the branch target address, to the second instruction buffer circuitry 220. Advantageously, the buffer controller circuitry 255 ensures that the decoder circuitry 235 is continuously coupled to one of the instruction buffer circuitry 215, 220. Advantageously, the buffer controller circuitry 255 sequences use of the instruction buffer circuitry 215, 220 to prevent delays between decoding and executing instruction packets at a branch target address.

Figure 3A:
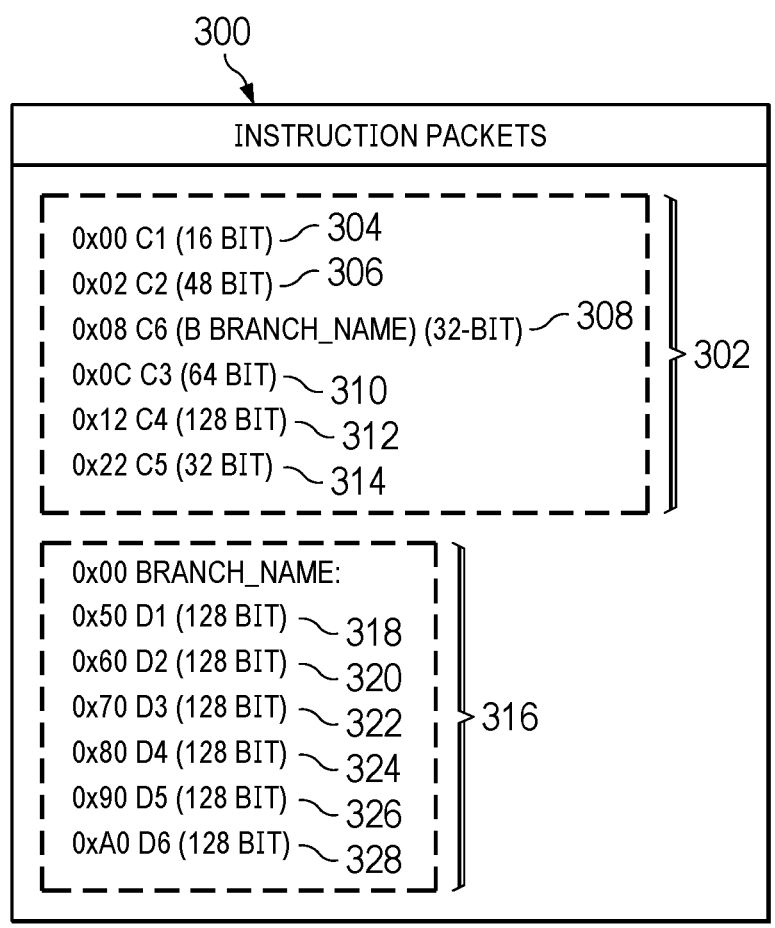
FIG. 3A illustrates an example order of execution of an example list of machine-readable instructions, wherein the order of execution is to preemptively execute a branch instruction.

FIG. 3A illustrates an example list of instruction packets 300 that, when executed by the programmable circuitry 205 of FIG. 2, preemptively execute branch operations. In the example of FIG. 3A, the list of instruction packets 300 include a first example instruction set 302, a first example instruction packet 304, a second example instruction packet 306, a third example instruction packet 308, a fourth example instruction packet 310, a fifth example instruction packet 312, a sixth example instruction packet 314, a second example instruction set 316, a seventh example instruction packet 318, an eighth example instruction packet 320, a ninth example instruction packet 322, a tenth example instruction packet 324, an eleventh example instruction packet 326, and a twelfth example instruction packet 328. Prior to reordering by a compiler, instruction packet 308 followed by the instruction packet 314, and thus the logical order of operations is instruction packets 304 and 306, followed by instruction packets 310, 312, and 314, followed by instruction packet 308. However, in the interest of efficient execution, instruction packet 308 is advanced ahead of instruction packets 310, 312, and 314 by the compiler. The list of instruction packets 300 are an example of the instruction packets of the memory chunk buffer circuitry 164 of FIG. 1. The programmable circuitry 205 sequentially executes the list of instruction packets 300 during runtime. However, branch operations of the list of instruction packets 300 modify the order of execution of the list of instruction packets 300. Such an example operation is illustrated and described in connection with FIG. 3C, below.

The instruction packets 304, 306, 308, 310, 312, 314, 318, 320, 322, 324, 326, 328 represent operations of the programmable circuitry 205. In the example of FIG. 3A, each of the instruction packets 304, 306, 308, 310, 312, 314, 318, 320, 322, 324, 326, 328 include at least a start bit, an opcode, and/or an operand. In some examples, each of the instruction packets 304, 306, 308, 310, 312, 314, 318, 320, 322, 324, 326, 328 may include one or more additional elements that are not illustrated in FIG. 3A. For example, branch instruction packets may include delay bits. As illustrated in FIG. 3B, each of the instruction packets 304, 306, 308, 310, 312, 314, 318, 320, 322, 324, 326, 328 are stored in the order of execution illustrated in FIG. 3A.

The start bits of instruction packets 304, 306, 308, 310, 312, 314, 318, 320, 322, 324, 326, 328 represent a memory location of each of the instruction packets 304, 306, 308, 310, 312, 314, 318, 320, 322, 324, 326, 328. A start bit of a subsequent one of the instruction packets 304, 306, 308, 310, 312, 314, 318, 320, 322, 324, 326, 328 is determined based on the start bit of the prior one of the instruction packets 304, 306, 308, 310, 312, 314, 318, 320, 322, 324, 326, 328 and a length of the prior one of the instruction packets 304, 306, 308, 310, 312, 314, 318, 320, 322, 324, 326, 328. In some examples, the length of the instruction packets 304, 306, 308, 310, 312, 314, 318, 320, 322, 324, 326, 328 may be from sixteen bits to one-hundred and twenty-eight bits. The programmable circuitry 205 sequentially fetches the instruction packets 304, 306, 308, 310, 312, 314, 318, 320, 322, 324, 326, 328 based on the start bit. The order of execution of the instruction packets 304, 306, 308, 310, 312, 314, 318, 320, 322, 324, 326, 328 is determined by the compiler circuitry 108. In some examples, the branch sequencing circuitry 128 of FIG. 1 adjusts the order of execution to preemptively execute one or more branch instructions.

In example operations, the branch detection circuitry 132 of FIG. 1 supplies the opcodes and/or operands of the instruction packets 304, 306, 310, 312, 314 to the instruction buffer circuitry 144 of FIG. 1. After placing the opcodes and/or operands of the instruction packets 304, 306, 310, 312, 314 in the instruction buffer circuitry 144, the branch detection circuitry 132 determines that the opcode of the third instruction packet 308 corresponds to a branch operation. The branch detection circuitry 132 supplies the opcode and operand of the third instruction packet 308 to the branch relocation circuitry 140 of FIG. 1 responsive to determining the branch operation of the opcode is an unconditional operation. The branch relocation circuitry 140 adjusts the start bits of the opcodes and/or operands of the instruction packets 310, 312, 314 to reorder the opcode and operand of the third instruction packet 308. In such example operations, the branch relocation circuitry 140 reorders the opcode and operand of the third instruction packet 308 from executing after the sixth instruction packet 314 to executing after the second instruction packet 306.

In the example of FIG. 3A, the second instruction set 316 represents operations to be performed responsive to an execution of the branch instruction of the third instruction packet 308. However, as further discussed in connection with FIG. 3C, the programmable circuitry 205 continues to fetch, decode, and/or execute the instruction packets 310, 312, 314, while fetching and decoding the second instruction set 316. While the programmable circuitry 205 decodes and executes the instruction packets 310, 312, 314 using the first instruction buffer circuitry 215 of FIG. 2, the address generation circuitry 250 of FIG. 2 begins to fetch the memory chunks storing the instruction packets 318, 320, 322, 324, 326, 328. Advantageously, the programmable circuitry 205 may begin to decode the instructions packets 318, 320, 322, 324, 326, 328 immediately following decoding the sixth instruction packet 314.

FIG. 3B illustrates an example placement of the list of instruction packets 300 of FIG. 3A in an example memory 330. In the example of FIG. 3B, the memory 330 includes a first example memory chunk 332, a second example memory chunk 334, a third example memory chunk 336, a fourth example memory chunk 338, a fifth example memory chunk 340, a sixth example memory chunk 342, a seventh example memory chunk 344, an eighth example memory chunk 346, and a ninth example memory chunk 348. The memory 330 of FIG. 3B is another example of the memory 168 of FIGS. 1 and 2. The memory 330 is separated into the memory chunks 332, 334, 336, 338, 340, 342, 344, 346, 348. In the example of FIG. 3B, each of the memory chunks 332, 334, 336, 338, 340, 342, 344, 346, 348 has a length of one-hundred and twenty-eight bits. Alternatively, the memory 330 may be separated into chunks of alternative lengths. For example, lengths of sixty-four bits, two-hundred and fifty-six bits, etc.

The memory chunks 332, 334, 336, 338, 340, 342, 344, 346, 348 represent portions of the memory 330 that may store one or more of the instruction packets 304, 306, 308, 310, 312, 314, 318, 320, 322, 324, 326, 328. In the example of FIG. 3B, each of the memory chunks 332, 334, 336, 338, 340, 342, 344, 346, 348 are addressable by a memory address and/or a data identifier. In example operation, the memory 330 may receive a read command from the address generation circuitry 250 of FIG. 2 including a memory address and/or data identifier that identify one of the memory chunks 332, 334, 336, 338, 340, 342, 344, 346, 348. In such examples, responsive to receiving the read command, the memory 330 supplies the one of the memory chunks 332, 334, 336, 338, 340, 342, 344, 346, 348 to one of the instruction buffer circuitry 215, 220 of FIG. 2.

In example operations, the compiler circuitry 108 of FIG. 1 sequentially stores each of the instruction packets 304, 306, 308, 310, 312, 314, 318, 320, 322, 324, 326, 328 in the memory 330. In such example operations, the memory chunk buffer circuitry 164 of FIG. 1 supplies the first one-hundred and twenty-eight bits of the list of instruction packets 300 to fill the first memory chunk 332. For example, the memory chunk buffer circuitry 164 supplies the instruction packets 304, 306, 308, and a first portion of the fourth instruction packet 310 to fill the first memory chunk 332. In such an example, the memory chunk buffer circuitry 164 supplies a second portion of the fourth instruction packet 310 and a first portion of the fifth instruction packet 312 to fill the second memory chunk 334. The programmable circuitry 205 may fetch the instruction packets 304, 306, 308, and the first portion of the fourth instruction packet 310 responsive to a read command specifying the address (e.g., 0x00) of the first memory chunk 332.

In other examples, such as the memory chunks 338, 340, 342, 344, 346, 348, only store one of the instruction packets 318, 320, 322, 324, 326, 328. In such examples, each of the instruction packets 318, 320, 322, 324, 326, 328 are approximately the same length as the memory chunks 338, 340, 342, 344, 346, 348. Although in the example of FIG. 3B, each of the memory chunks 338, 340, 342, 344, 346, 348 store one of the instruction packets 318, 320, 322, 324, 326, 328, the memory chunk buffer circuitry 164 may separate the instruction packets 318, 320, 322, 324, 326, 328 into separate portions. In such examples, if a branch instruction were to be added to the second instruction set 316, the delay encoder circuitry 160 may determine delay information to fetch four memory chunks prior to fetching instructions at a branch target address.

FIG. 3C illustrates example operations 350 of the programmable circuitry 205 of FIG. 2 to fetch, decode, and execute the list of instruction packets 300 of FIG. 3A from the memory 330 of FIG. 3B. In the example of FIG. 3C, the operations 350 occur based on cycles of the cycle clock from the cycle clock circuitry 230 of FIG. 2. In some examples, operations of the programmable circuitry 205 are described as a pipeline. In such examples, the pipeline includes a first fetch stage (F1), a second fetch stage (F2), a first decode stage (D1), and a second decode stage (D2).

The first fetch stage represents example operations of address generation circuitry 250 of FIG. 2. In the example of FIG. 3C, information of the first fetch stage represents the memory address of the read command from the address generation circuitry 250. The second fetch stage represents example operations of the instruction buffer circuitry 215, 220 of FIG. 2. In the example of FIG. 3C, information of the second fetch stage represents the one or more of the memory chunks 332, 334, 336, 338, 340, 342, 344, 346, 348 of FIG.

3B in the instruction buffer circuitry 215, 220. The first and second fetch stages represent the operations of the address generation circuitry 250 and the instruction buffer circuitry 215, 220 to fetch one of the memory chunks 332, 334, 336, 338, 340, 342, 344, 346, 348.

The first decode stage represents example operations of the decoder circuitry 235 of FIG. 2. In the example of FIG. 3C, information of the first decode stage represents the one of the instruction packets 304, 306, 308, 310, 312, 314, 318, 320, 322, 324, 326, 328 determined by decoding one of the memory chunks 332, 334, 336, 338, 340, 342, 344, 346, 348 in one of the instruction buffer circuitry 215, 220. The second decode stage represents example operations of the execution circuitry 240 of FIG. 2. In the example of FIG. 3C, information of the second decode stage represents the one of the instruction packets 304, 306, 308, 310, 312, 314, 318, 320, 322, 324, 326, 328 being executed by the execution circuitry 240. When in the second decode stage, the execution circuitry 240 instantiates circuitry to perform the operation of the one of the instruction packets 304, 306, 308, 310, 312, 314, 318, 320, 322, 324, 326, 328.

The operations 350 begin with a first cycle 352, at which the address generation circuitry 250 generates a first read command with the memory address of the first memory chunk 332. During the first cycle 352, the address generation circuitry 250 supplies the first read command to the memory 168.

During a second cycle 354, the memory 168 supplies the first memory chunk 332 to the demultiplexer circuitry 210 of FIG. 2. During the second cycle 354, the multiplexer circuitry 210, 225 of FIG. 2 couple the first instruction buffer circuitry 215 of FIG. 2 to the memory 168 and the decoder circuitry 235. During the second cycle 354, the first instruction buffer circuitry 215 stores the first memory chunk 332. Also, during the second cycle 354, the address generation circuitry 250 generates a second read command with the memory address of the second memory chunk 334. During the second cycle 354, the address generation circuitry 250 supplies the second read command to the memory 168.

During a third example cycle 356, the decoder circuitry 235 decodes the first memory chunk 332 in the first instruction buffer circuitry 215 to determine the first instruction packet 304. During the third example cycle 356, the memory 168 supplies the second memory chunk 334 to the first instruction buffer circuitry 215. Also, during the third cycle 356, the address generation circuitry 250 generates a third read command with the memory address of the third memory chunk 336. During the third cycle 356, the address generation circuitry 250 supplies the third read command to the memory 168.

During a fourth cycle 358, the execution circuitry 240 instantiates circuitry to perform the operations of the first instruction packet 304. During the fourth cycle 358, the decoder circuitry 235 continues to decode the first memory chunk 332 in the first instruction buffer circuitry 215 to determine the second instruction packet 306. During the fourth example cycle 358, the memory 168 supplies the third memory chunk 336 to the first instruction buffer circuitry 215. Also, during the fourth cycle 358, the address generation circuitry 250 generates a fourth read command with the memory address of a subsequent memory chunk. During the fourth cycle 358, the address generation circuitry 250 supplies the fourth read command to the memory 168.

During a fifth cycle 360, the execution circuitry 240 instantiates circuitry to perform the operations of the second instruction packet 306. During the fifth cycle 360, the decoder circuitry 235 continues to decode the first memory chunk 332 in the first instruction buffer circuitry 215 to determine the third instruction packet 308. During the fifth example cycle 360, the memory 168 supplies the subsequent memory chunk to the first instruction buffer circuitry 215. However, during the fifth cycle 360, the buffer controller circuitry 255 of FIG. 2 determines the first instruction buffer circuitry 215 is full. During the fifth cycle 360, the buffer controller circuitry 255 prevents the address generation circuitry 250 from generating subsequent read commands.

During a sixth cycle 362, the execution circuitry 240 supplies the third instruction packet 308 to the discontinuity controller circuitry 245 of FIG. 2 responsive to determining the opcode of the third instruction packet 308 corresponds to a branch operation. In some examples, the execution circuitry 240 instantiates the discontinuity controller circuitry 245 responsive to the third instruction packet 308. During the sixth cycle 362, the decoder circuitry 235 finishes decoding the first memory chunk 332 and begins decoding the second memory chunk 334 to determine the fourth instruction packet 310. During the sixth cycle 362, the discontinuity controller circuitry 245 determines the delay information of the third instruction packet 308. During the sixth cycle 362, the discontinuity controller circuitry 245 determines that the instruction packets 310, 312, 314 are already in the first instruction buffer circuitry 215 based on the delay information. At the sixth cycle 362, the discontinuity controller circuitry 245 supplies the branch target address from the third instruction packet 308 to the address generation circuitry 250 and generates the delay complete indication.

During a seventh cycle 364, the execution circuitry 240 instantiates circuitry to perform the operations of the fourth instruction packet 310. During the seventh cycle 364, the decoder circuitry 235 finishes decoding the second memory chunk 334 and begins to decode the third memory chunk 336 to determine the fifth instruction packet 312. During the seventh cycle 364, the address generation circuitry 250 may update a program counter based on the branch target address and use the program counter to generate a fifth read command with the memory address of the fourth memory chunk 338. During the seventh cycle 364, the address generation circuitry 250 supplies the fifth read command to the memory 168. Also, during the seventh cycle 364, the buffer controller circuitry 255 adjusts the demultiplexer circuitry 210 to couple the second instruction buffer circuitry 220 to the memory 168.

During an eighth cycle 366, the execution circuitry 240 instantiates circuitry to perform the operations of the fifth instruction packet 312. During the eighth cycle 366, the decoder circuitry 235 continues to decode the third memory chunk 336 in the first instruction buffer circuitry 215 to determine the sixth instruction packet 314. During the eighth cycle 366, the memory 168 supplies the fourth memory chunk 338 to the second instruction buffer circuitry 220. Also, during the eighth cycle 366, the address generation circuitry 250 generates a sixth read command with the memory address of the fifth memory chunk 340. During the eighth cycle 366, the address generation circuitry 250 supplies the sixth read command to the memory 168. After the eighth cycle 366, the buffer controller circuitry 255 adjusts the multiplexer circuitry 225 to couple the second instruction buffer circuitry 220 to the decoder circuitry 235.

During a ninth cycle 368, the execution circuitry 240 instantiates circuitry to perform the operations of the sixth instruction packet 314. During the ninth cycle 368, the decoder circuitry 235 begins to decode the fourth memory chunk 338 in the second instruction buffer circuitry 220 to determine the seventh instruction packet 318. During the ninth cycle 368, the memory 168 supplies the fifth memory chunk 340 to the second instruction buffer circuitry 220. Also, during the ninth cycle 368, the address generation circuitry 250 generates a seventh read command with the memory address of the sixth memory chunk 342. During the ninth cycle 368, the address generation circuitry 250 supplies the seventh read command to the memory 168.

During a tenth cycle 370, the execution circuitry 240 instantiates circuitry to perform the operations of the seventh instruction packet 318. During the tenth cycle 370, the decoder circuitry 235 begins to decode the fifth memory chunk 340 in the second instruction buffer circuitry 220 to determine the eighth instruction packet 320. During the tenth cycle 370, the memory 168 supplies the sixth memory chunk 342 to the second instruction buffer circuitry 220. Also, during the tenth cycle 370, the address generation circuitry 250 generates an eighth read command with the memory address of the seventh memory chunk 344. During the tenth cycle 370, the address generation circuitry 250 supplies the eighth read command to the memory 168.

During an eleventh cycle 372, the execution circuitry 240 instantiates circuitry to perform the operations of the eighth instruction packet 320. During the eleventh cycle 372, the decoder circuitry 235 begins to decode the sixth memory chunk 342 in the second instruction buffer circuitry 220 to determine the ninth instruction packet 322. During the eleventh cycle 372, the memory 168 supplies the seventh memory chunk 344 to the second instruction buffer circuitry 220. Also, during the eleventh cycle 372, the address generation circuitry 250 generates a ninth read command with the memory address of the eighth memory chunk 346. During the eleventh cycle 372, the address generation circuitry 250 supplies the ninth read command to the memory 168. The programmable circuitry 205 continues to proceed to perform the list of instruction packets 300.

Advantageously, the programmable circuitry 205 continues to execute instructions (e.g., the instructions of packets C3, C4, and C5) following execution of a branch instruction. Advantageously, the discontinuity controller circuitry 245 and the buffer controller circuitry 255 sequence the use of the instruction buffer circuitry 215, 220 to continue to supply instructions to the decoder circuitry 235. Advantageously, preemptively executing the third instruction packet 308 allows the programmable circuitry 205 to continue to operate while the second instruction set 316 is being fetched and decoded.

Figure 4A:
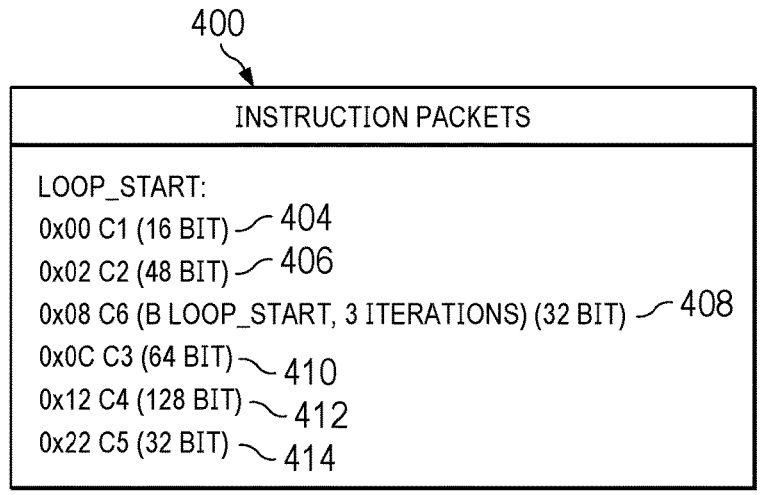
FIG. 4A illustrates an example order of execution of an example list of machine-readable instructions, wherein the order of execution is to preemptively execute a branch instruction for loop operations.

FIG. 4A illustrates another example list of instruction packets 400 that, when executed by the programmable circuitry 205 of FIG. 2, preemptively execute branch operations to loop through the list of instruction packets 400. In the example of FIG. 4A, the list of instruction packets 400 include a first example instruction packet 404, a second example instruction packet 406, a third example instruction packet 408, a fourth example instruction packet 410, a fifth example instruction packet 412, and a sixth example instruction packet 414. Similar to the list of instruction packets 300 of FIG. 3A, the list of instruction packets 400 is another example of the instruction packets of the memory chunk buffer circuitry 164 of FIG. 1. Prior to reordering by a compiler, instruction packet 408 followed by the instruction packet 414, and thus the logical order of operations is instruction packets 404 and 406, followed by instruction packets 410, 412, and 414, followed by instruction packet 408. However, in the interest of efficient execution, instruction packet 408 is advanced ahead of instruction packets 410, 412, and 414 by the compiler. The programmable circuitry 205 sequentially executes the list of instruction packets 400 during runtime. However, branch operations of the list of instruction packets 400 alter the order of execution of the list of instruction packets 400. For example, the programmable circuitry 205 begins executing the first instruction packet 404 responsive to executing the third instruction packet 408. Such an example operation is illustrated and described in connection with FIG. 4C, below.

Figure 4B:
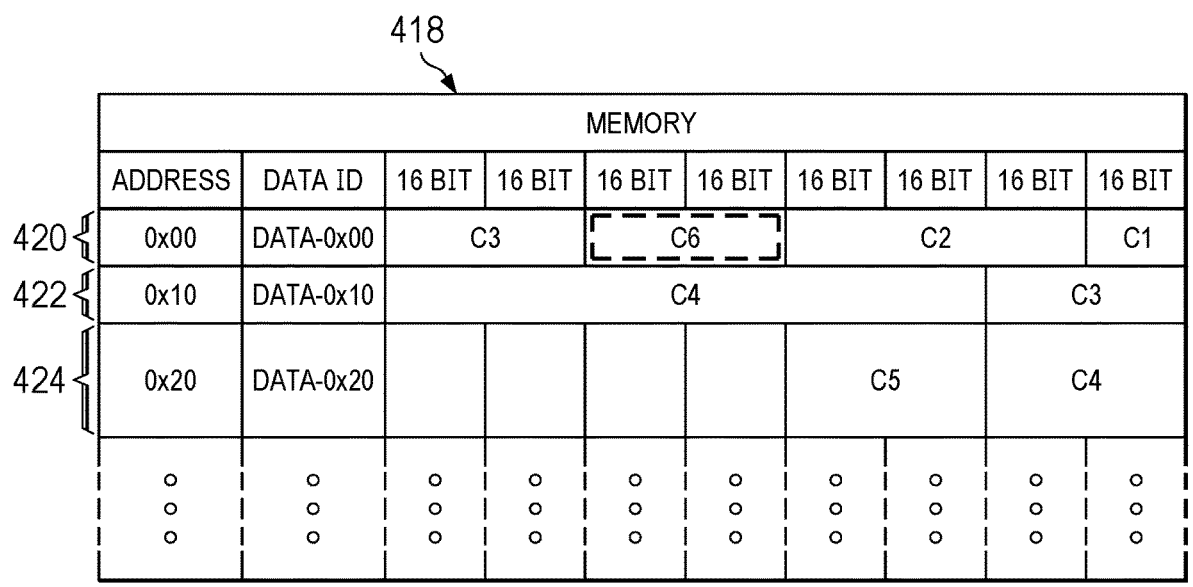
FIG. 4B illustrates an example placement of instructions of the list of machine-readable instructions of FIG. 4A in the example memory of FIGS. 1 and 2, wherein the instructions are placed based on the order of execution of FIG. 4A.

The instruction packets 404, 406, 408, 410, 412, 414 represent operations of the programmable circuitry 205. In the example of FIG. 4A, each of the instruction packets 404, 406, 408, 410, 412, 414 include at least a start bit, an opcode, and/or an operand. In some examples, each of the instruction packets 404, 406, 408, 410, 412, 414 may include one or more additional elements that are not illustrated in FIG. 4A. For example, branch instruction packets may include delay bits. As illustrated in FIG. 4B, each of the instruction packets 404, 406, 408, 410, 412, 414 are stored in the order of execution illustrated in FIG. 4A.

The start bits of instruction packets 404, 406, 408, 410, 412, 414 represent a memory location of each of the instruction packets 404, 406, 408, 410, 412, 414. A start bit of a subsequent one of the instruction packets 404, 406, 408, 410, 412, 414 is determined based on the start bit of the prior one of the instruction packets 404, 406, 408, 410, 412, 414 and a length of the prior one of the instruction packets 404, 406, 408, 410, 412, 414. In some examples, the length of the instruction packets 404, 406, 408, 410, 412, 414 may be from sixteen bits to one-hundred and twenty-eight bits. The programmable circuitry 205 sequentially fetches the instruction packets 404, 406, 408, 410, 412, 414 based on the start bit. The order of execution of the instruction packets 404, 406, 408, 410, 412, 414 is determined by the compiler circuitry 108. In some examples, the branch sequencing circuitry 128 of FIG. 1 adjusts the order of execution to preemptively execute one or more branch instructions.

In example operations, the branch detection circuitry 132 of FIG. 1 supplies the opcodes and/or operands of the instruction packets 404, 406, 408, 412, 414 to the instruction buffer circuitry 144 of FIG. 1. After placing the opcodes and/or operands of the instruction packets 404, 406, 408, 412, 414 in the instruction buffer circuitry 144, the branch detection circuitry 132 determines that the opcode of the third instruction packet 408 corresponds to a branch operation. The branch detection circuitry 132 supplies the opcode and operand of the third instruction packet 408 to the branch relocation circuitry 140 of FIG. 1 responsive to determining the branch operation of the opcode is an unconditional operation. The branch relocation circuitry 140 adjusts the start bits of the opcodes and/or operands of the instruction packets 410, 412, 414 to reorder the opcode and operand of the third instruction packet 408. In such example operations, the branch relocation circuitry 140 reorders the opcode and operand of the third instruction packet 408 from executing after the sixth instruction packet 414 to executing after the second instruction packet 406.

In the example of FIG. 4A, the programmable circuitry 205 re-fetches, decodes, and executes the instruction packets 404, 406, 408, 410, 412, 414 responsive to an execution of the branch instruction of the third instruction packet 408. However, as further discussed in connection with FIG. 4C, the programmable circuitry 205 continues to fetch, decode, and/or execute the instruction packets 410, 412, 414, while re-fetching and re-decoding the instruction packets 404, 406, 408, 410, 412, 414. While the programmable circuitry 205 decodes and executes the instruction packets 410, 412, 414 using the first instruction buffer circuitry 215 of FIG. 2, the address generation circuitry 250 of FIG. 2 begins to fetch the memory chunks storing the instruction packets 404, 406, 408, 410, 412, 414. Advantageously, the programmable circuitry 205 may begin to decode the instructions packets 404, 406, 408, 410, 412, 414 immediately following decoding the sixth instruction packet 414.

FIG. 4B illustrates an example placement of the list of instruction packets 400 of FIG. 4A in an example memory 418. In the example of FIG. 4B, the memory 418 includes a first example memory chunk 420, a second example memory chunk 422, and a third example memory chunk 424. The memory 418 of FIG. 4B is another example of the memory 168, 330 of FIGS. 1, 2, and 3. The memory 418 is separated into the memory chunks 420, 422, 424. In the example of FIG. 4B, each of the memory chunks 420, 422, 424 has a length of one-hundred and twenty-eight bits. Alternatively, the memory 418 may be separated into chunks of alternative lengths. For example, lengths of sixty-four bits, two-hundred and fifty-six bits, etc.

The memory chunks 420, 422, 424 represent portions of the memory 418 that may store one or more of the instruction packets 404, 406, 408, 410, 412, 414. In the example of FIG. 4B, each of the memory chunks 420, 422, 424 are addressable by a memory address and/or a data identifier. In example operation, the memory 418 may receive a read command from the address generation circuitry 250 of FIG. 2 including a memory address and/or data identifier that identify one of the memory chunks 420, 422, 424. In such examples, responsive to receiving the read command, the memory 418 supplies the one of the memory chunks 420, 422, 424 to one of the instruction buffer circuitry 215, 220 of FIG. 2.

In example operations, the compiler circuitry 108 of FIG. 1 sequentially stores each of the instruction packets 404, 406, 408, 410, 412, 414 in the memory 418. In such example operations, the memory chunk buffer circuitry 164 of FIG. 1 supplies the first one-hundred and twenty-eight bits of the list of instruction packets 400 to fill the first memory chunk 420. For example, the memory chunk buffer circuitry 164 supplies the instruction packets 404, 406, 408, and a first portion of the fourth instruction packet 410 to fill the first memory chunk 420. In such an example, the memory chunk buffer circuitry 164 supplies a second portion of the fourth instruction packet 410 and a first portion of the fifth instruction packet 412 to fill the second memory chunk 422. The programmable circuitry 205 may fetch the instruction packets 404, 406, 408, and the first portion of the fourth instruction packet 410 responsive to a read command specifying the address (e.g., 0x00) of the first memory chunk 420.

In other examples, such as the memory chunks 338, 340, 342, 344, 346, 348 of FIG. 3B, the memory chunks 420, 422, 424 may only store one of the instruction packets 404, 406, 408, 410, 412, 414. In such examples, each of the instruction packets 404, 406, 408, 410, 412, 414 are approximately the same length as the memory chunks 420, 422, 424.

FIG. 4C illustrates example operations 426 of the programmable circuitry 205 of FIG. 2 to fetch, decode, and execute the list of instruction packets 400 of FIG. 4A from the memory 418 of FIG. 4B. In the example of FIG. 4C, the operations 426 occur based on cycles of the cycle clock from the cycle clock circuitry 230 of FIG. 2. In some examples, operations of the programmable circuitry 205 are described as a pipeline. In such examples, the pipeline includes a first fetch stage (F1), a second fetch stage (F2), a first decode stage (D1), and a second decode stage (D2).

The first fetch stage represents example operations of address generation circuitry 250 of FIG. 2. In the example of FIG. 4C, information of the first fetch stage represents the memory address of the read command from the address generation circuitry 250. The second fetch stage represents example operations of the instruction buffer circuitry 215, 220 of FIG. 2. In the example of FIG. 4C, information of the second fetch stage represents the one or more of the memory chunks 420, 422, 424 of FIG. 4B in the instruction buffer circuitry 215, 220. The first and second fetch stages represent the operations of the address generation circuitry 250 and the instruction buffer circuitry 215, 220 to fetch one of the memory chunks 420, 422, 424.

The first decode stage represents example operations of the decoder circuitry 235 of FIG. 2. In the example of FIG. 4C, information of the first decode stage represents the one of the instruction packets 404, 406, 408, 410, 412, 414 determined by decoding one of the memory chunks 420, 422, 424 in one of the instruction buffer circuitry 215, 220. The second decode stage represents example operations of the execution circuitry 240 of FIG. 2. In the example of FIG. 4C, information of the second decode stage represents the one of the instruction packets 404, 406, 408, 410, 412, 414 being executed by the execution circuitry 240. When in the second decode stage, the execution circuitry 240 instantiates circuitry to perform the operation of the one of the instruction packets 404, 406, 408, 410, 412, 414.

The operations 426 begin with a first cycle 428, at which the address generation circuitry 250 generates a first read command with the memory address of the first memory chunk 420. During the first cycle 428, the address generation circuitry 250 supplies the first read command to the memory 168.

During a second cycle 430, the memory 168 supplies the first memory chunk 420 to the demultiplexer circuitry 210 of FIG. 2. During the second cycle 430, the multiplexer circuitry 210, 225 of FIG. 2 couple the first instruction buffer circuitry 215 of FIG. 2 to the memory 168 and the decoder circuitry 235. During the second cycle 430, the first instruction buffer circuitry 215 stores the first memory chunk 420. Also, during the second cycle 430, the address generation circuitry 250 generates a second read command with the memory address of the second memory chunk 422. During the second cycle 430, the address generation circuitry 250 supplies the second read command to the memory 168.

During a third example cycle 432, the decoder circuitry 235 decodes the first memory chunk 420 in the first instruction buffer circuitry 215 to determine the first instruction packet 404. During the third example cycle 432, the memory 168 supplies the second memory chunk 422 to the first instruction buffer circuitry 215. Also, during the third cycle 432, the address generation circuitry 250 generates a third read command with the memory address of the third memory chunk 424. During the third cycle 432, the address generation circuitry 250 supplies the third read command to the memory 168.

During a fourth cycle 434, the execution circuitry 240 instantiates circuitry to perform the operations of the first instruction packet 404. During the fourth cycle 434, the decoder circuitry 235 continues to decode the first memory chunk 420 in the first instruction buffer circuitry 215 to determine the second instruction packet 406. During the fourth example cycle 434, the memory 168 supplies the third memory chunk 424 to the first instruction buffer circuitry 215. Also, during the fourth cycle 434, the address generation circuitry 250 generates a fourth read command with the memory address of a subsequent memory chunk. During the fourth cycle 434, the address generation circuitry 250 supplies the fourth read command to the memory 168.

During a fifth cycle 436, the execution circuitry 240 instantiates circuitry to perform the operations of the second instruction packet 406. During the fifth cycle 436, the decoder circuitry 235 continues to decode the first memory chunk 420 in the first instruction buffer circuitry 215 to determine the third instruction packet 408. During the fifth example cycle 436, the memory 168 supplies the subsequent memory chunk to the first instruction buffer circuitry 215. However, during the fifth cycle 436, the buffer controller circuitry 255 of FIG. 2 determines the first instruction buffer circuitry 215 is full. During the fifth cycle 436, the buffer controller circuitry 255 prevents the address generation circuitry 250 from generating subsequent read commands.

During a sixth cycle 438, the execution circuitry 240 supplies the third instruction packet 408 to the discontinuity controller circuitry 245 of FIG. 2 responsive to determining the opcode of the third instruction packet 408 corresponds to a branch operation. In some examples, the execution circuitry 240 instantiates the discontinuity controller circuitry 245 responsive to the third instruction packet 408. During the sixth cycle 438, the decoder circuitry 235 finishes decoding the first memory chunk 420 and begins decoding the second memory chunk 422 to determine the fourth instruction packet 410. During the sixth cycle 438, the discontinuity controller circuitry 245 determines the delay information of the third instruction packet 408. During the sixth cycle 438, the discontinuity controller circuitry 245 determines that the instruction packets 410, 412, 414 are already in the first instruction buffer circuitry 215 based on the delay information. At the sixth cycle 438, the discontinuity controller circuitry 245 supplies the branch target address from the third instruction packet 408 to the address generation circuitry 250 and generates the delay complete indication.

During a seventh cycle 440, the execution circuitry 240 instantiates circuitry to perform the operations of the fourth instruction packet 410. During the seventh cycle 440, the decoder circuitry 235 finishes decoding the second memory chunk 422 and begins to decode the third memory chunk 424 to determine the fifth instruction packet 412. During the seventh cycle 440, the address generation circuitry 250 may update a program counter based on the branch target address and use the program counter to generate another instance of the first read command with the memory address of the first memory chunk 420. During the seventh cycle 440, the address generation circuitry 250 supplies the first read command to the memory 168. Also, during the seventh cycle 440, the buffer controller circuitry 255 adjusts the demultiplexer circuitry 210 to couple the second instruction buffer circuitry 220 to the memory 168.

During an eighth cycle 442, the execution circuitry 240 instantiates circuitry to perform the operations of the sixth instruction packet 414. During the eighth cycle 442, the decoder circuitry 235 continues to decode the third memory chunk 424 in the first instruction buffer circuitry 215 to determine the sixth instruction packet 414. During the eighth cycle 442, the memory 168 supplies the first memory chunk 420 to the second instruction buffer circuitry 220. Also, during the eighth cycle 442, the address generation circuitry 250 generates another instance of the second read command with the memory address of the second memory chunk 422. During the eighth cycle 442, the address generation circuitry 250 supplies the second read command to the memory 168. After the eighth cycle 442, the buffer controller circuitry 255 adjusts the multiplexer circuitry 225 to couple the second instruction buffer circuitry 220 to the decoder circuitry 235.

During a ninth cycle 444, the execution circuitry 240 instantiates circuitry to perform the operations of the sixth instruction packet 414. During the ninth cycle 444, the decoder circuitry 235 begins to decode the first memory chunk 420 in the second instruction buffer circuitry 220 to determine the first instruction packet 404. During the ninth cycle 444, the memory 168 supplies the second memory chunk 422 to the second instruction buffer circuitry 220. Also, during the ninth cycle 444, the address generation circuitry 250 generates another instance of the third read command with the memory address of the third memory chunk 424. During the ninth cycle 444, the address generation circuitry 250 supplies the third read command to the memory 168.

During a tenth cycle 446, the execution circuitry 240 instantiates circuitry to perform the operations of the first instruction packet 404. During the tenth cycle 446, the decoder circuitry 235 continues to decode the first memory chunk 420 in the second instruction buffer circuitry 220 to determine the second instruction packet 406. During the tenth cycle 446, the memory 168 supplies the third memory chunk 424 to the second instruction buffer circuitry 220. Also, during the tenth cycle 446, the address generation circuitry 250 generates another instance of the fourth read command with the memory address of the subsequent memory chunk. During the tenth cycle 446, the address generation circuitry 250 supplies the fourth read command to the memory 168.

During an eleventh cycle 448, the execution circuitry 240 instantiates circuitry to perform the operations of the second instruction packet 406. During the eleventh cycle 448, the decoder circuitry 235 continues to decode the first memory chunk 420 in the second instruction buffer circuitry 220 to determine the third instruction packet 408. During the eleventh example cycle 448, the memory 168 supplies the subsequent memory chunk to the second instruction buffer circuitry 220. However, during the eleventh cycle 448, the buffer controller circuitry 255 determines the second instruction buffer circuitry 220 is full. During the eleventh cycle 448, the buffer controller circuitry 255 prevents the address generation circuitry 250 from generating subsequent read commands until the second instruction buffer circuitry 220 is capable of storing additional ones of the memory chunks 420, 422, 424.

During a twelfth cycle 450, the execution circuitry 240 supplies the third instruction packet 408 to the discontinuity controller circuitry 245 responsive to determining the opcode of the third instruction packet 408 corresponds to a branch operation. In some examples, the execution circuitry 240 instantiates the discontinuity controller circuitry 245 responsive to the third instruction packet 408. During the twelfth cycle 450, the decoder circuitry 235 finishes decoding the first memory chunk 420 and begins decoding the second memory chunk 422 to determine the fourth instruction packet 410. During the twelfth cycle 450, the discontinuity controller circuitry 245 determines the delay information of the third instruction packet 408. During the twelfth cycle 450, the discontinuity controller circuitry 245 determines that the instruction packets 410, 412, 414 are already in the second instruction buffer circuitry 220 based on the delay information. At the twelfth cycle 450, the discontinuity controller circuitry 245 supplies the branch target address from the third instruction packet 408 to the address generation circuitry 250 and generates the delay complete indication.

During a thirteenth cycle 452, the execution circuitry 240 instantiates circuitry to perform the operations of the fourth instruction packet 410. During the thirteenth cycle 452, the decoder circuitry 235 finishes decoding the second memory chunk 422 and begins to decode the third memory chunk 424 to determine the fifth instruction packet 412. During the thirteenth cycle 452, the address generation circuitry 250 generates another instance of the first read command with the memory address of the first memory chunk 420. During the thirteenth cycle 452, the address generation circuitry 250 supplies the first read command to the memory 168. Also, during the seventh cycle 452, the buffer controller circuitry 255 adjusts the demultiplexer circuitry 210 to couple the first instruction buffer circuitry 215 to the memory 168.

Advantageously, the programmable circuitry 205 continues to execute instructions following execution of a branch instruction. Advantageously, the discontinuity controller circuitry 245 and the buffer controller circuitry 255 sequence the use of the instruction buffer circuitry 215, 220 to continue to supply instructions to the decoder circuitry 235. Advantageously, preemptively executing the third instruction packet 408 allows the programmable circuitry 205 to continue to operate while the instruction packets 404, 408 are being fetched and decoded.

FIG. 5 is an illustration of an example branch instruction 500, which illustrates an example branch instruction format. In the example of FIG. 5, the branch instruction 500 includes an opcode (OP_CODE(2:15)) 520, condition bits (COND) 530, delay bits (DELAY(0:1)) 540, first address bits (ADDR (16:31)) 560, and second address bits (ADDR(32:47)) 570. The branch instruction 500 is a forty-eight-bit instruction. Alternatively, the branch instruction 500 may be an alternative length instruction, such as a thirty-two-bit instruction, sixty-four-bit instruction, etc.

The opcode 520 identifies the operation of the branch instruction 500 as a branch operation. In example operation, during execution of the branch instruction 500, the opcode 520 configures the execution circuitry 240 of FIG. 2 to perform the branch operation. In such example operations, the execution circuitry 240 may instantiate the discontinuity controller circuitry 245 of FIG. 2 responsive to the execution circuitry 240 executing the branch instruction 500. In some examples, the opcode 520 includes the condition bits 530. In such examples, the condition bits 530 identify a condition that must be met for the branch instruction 500 to be executed. Such example branch instructions are referred to as conditional branch instructions. In example operation, the condition bits 530 identify an operation which checks one or more flags. In such example operations, the execution circuitry 240 performs the branch operation of the branch instruction 500 responsive to the condition corresponding to the condition bits 530 being met.

The delay bits 540 identify a number of chunks of memory that need to be fetched prior to fetching chunks of memory at the branch target address. In an example, when set to a first value (e.g., 0x0), the delay bits 540 specify that no further chunks of memory are to be read from memory. When set to a second value (e.g., 0x1), the delay bits 540 specify that two chunks of memory are to be read from memory. When set to a third value (0x2), the delay bits 540 specify that three chunks of memory are to be read from memory. When set to a fourth value (0x3), the delay bits 540 specify that three chunks of memory are to be read from memory. In some examples, the programmable circuitry 205 of FIG. 2 may determine whether the number of chunks of memory are already stored in one of the instruction buffer circuitry 215, 220 of FIG. 2. In such examples, when one or more of the chunks of memory specified by the delay bits 540 are in one of the instruction buffer circuitry 215, 220, the programmable circuitry 205 may reduce the number of chunks of memory to be read from the memory. Advantageously, the delay bits 540 allows the programmable circuitry 205 determine a number of chunks of memory that contain the reference number of instruction packets.

In some examples, the first value of the delay bits 540 may correspond to the branch instruction 500 not being a delay branch instruction. In such examples, when the delay bits 540 correspond to a non-delayed branch instruction, the programmable circuitry 205 halts execution of instructions after the branch instruction 500 until the instructions at the branch target address are to be executed.

The address bits 560, 570 identify the target branch address of the branch instruction 500. In the example of FIG. 5, the address bits 560, 570 specify a target branch address in memory, which is thirty-two-bits long. Alternatively, the address bits 560, 570 may contain alternative address lengths, such as a sixteen-bit address, sixty-four-bit address, etc. In some examples, the address bits 560, 570 include multiple target branch addresses. In such examples, a first one of the multiple target branch addresses corresponds to a first condition being met and a second one of the multiple target branch addresses corresponds to a second condition being met. For example, the execution circuitry 240 begins execution of a branch operation at a first target branch address when a set flag is a logic high or begins execution of a branch operation at a second target branch address when the set flag is a logic low.

Figure 6:
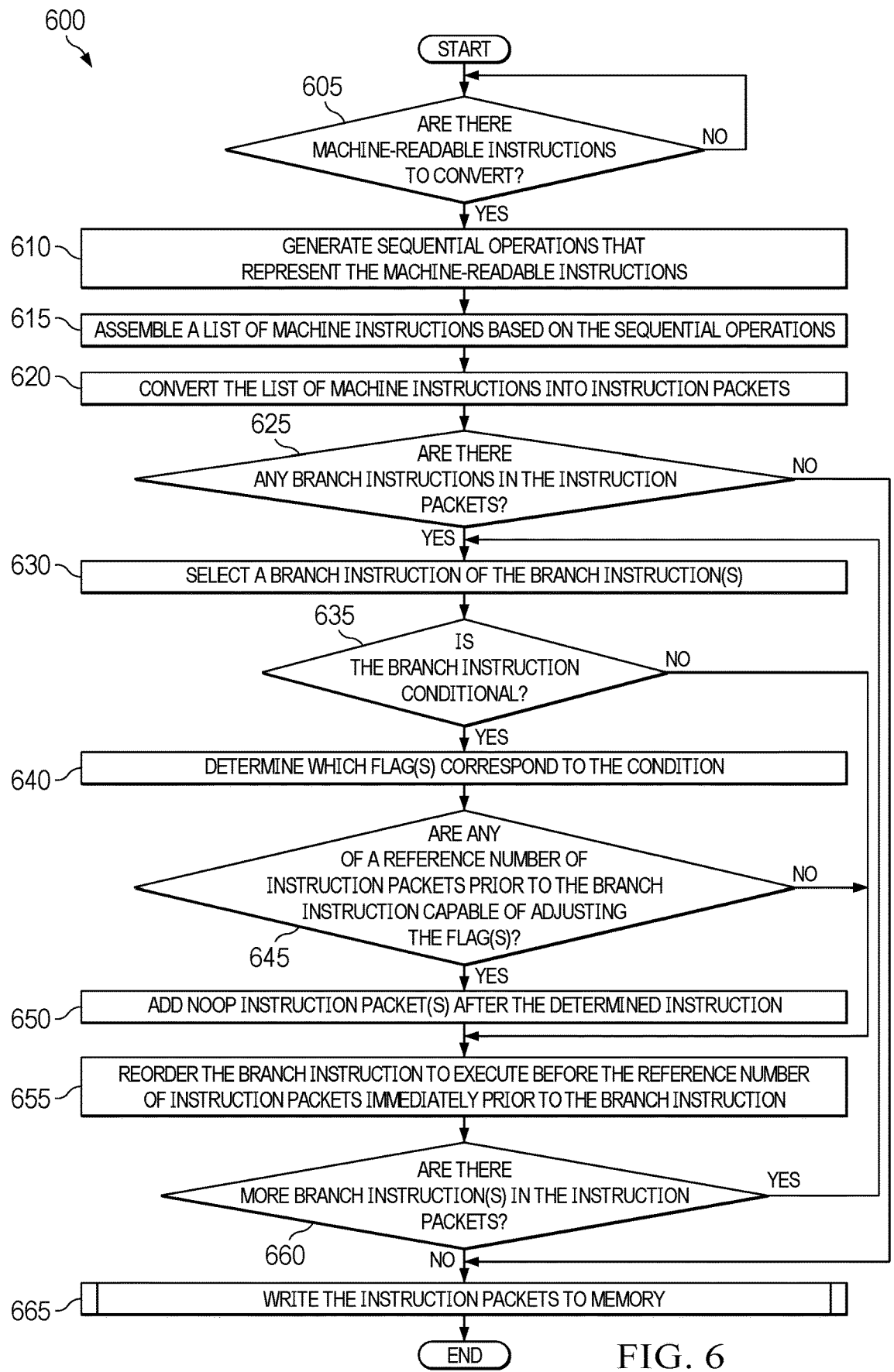
FIG. 6 is a flowchart representative of example machine-readable instructions and/or example operations that may be executed, instantiated, and/or performed using an example programmable circuitry implementation of the compiler circuitry of FIG. 1 to generate an order of execution of an example list of machine-readable instructions.

FIG. 6 is a flowchart representative of example machine-readable instructions and/or example operations 600 that may be executed, instantiated, and/or performed using an example programmable circuitry implementation of the compiler circuitry 108 of FIG. 1 to generate an example list of instruction packets, such as the list of instruction packets 300, 400 of FIGS. 3A and 4A. The example operations 600 begin at Block 605, at which, the operation determination circuitry 112 of FIG. 1 determines if there are machine-readable instructions to convert. In some examples, the operation determination circuitry 112 receives and/or accesses the machine-readable instructions 104 of FIG. 1. In such examples, the machine-readable instructions 104 may represent a relatively higher-level abstraction of operations of the programmable circuitry 205 of FIG. 2. For example, the machine-readable instructions 104 may represent operations represented by a programming language, such as assembly, C, C++, C#, Java, etc. If the operation determination circuitry 112 determines that there are no machine-readable instructions to convert (e.g., Block 605 returns a result of NO), control proceeds to return to Block 605.

If the operation determination circuitry 112 determines that there are machine-readable instructions to convert (e.g., Block 605 returns a result of YES), the operation determination circuitry 112 generates sequential operations that represent the machine-readable instructions. (Block 610). In some examples, the operation determination circuitry 112 generates operations that represent operations of the machine-readable instructions. In such examples, the operation determination circuitry 112 may generate one or more relatively lower-level operations to represent operations of one machine-readable instruction of the machine-readable instructions 104. Advantageously, the relatively lower-level operations of the operation determination circuitry 112 reduce the complexity of generating machine instructions specific to the programmable circuitry 205.

The instruction approximation circuitry 124 of FIG. 1 assembles a list of machine instructions based on the sequential operations. (Block 615). In some examples, the instruction approximation circuitry 124 approximates the relatively lower-level operations from the operation determination circuitry 112 to machine instructions. In such examples, the instruction approximation circuitry 124 uses the processor specific instructions 120 of FIG. 1 to determine opcodes and/or operands of the machine instructions.

The packet construction circuitry 126 of FIG. 1 converts the list of machine instructions into instruction packets. (Block 620). In some examples, the packet manager circuitry 152 adds additional bits and/or combines one or more machine instructions to form an instruction packet. In such examples, the additional bits allow the compiler circuitry 108 to encode additional information to the one or more machine instruction(s).

The branch detection circuitry 132 of FIG. 1 determines if there are any branch instructions in the instruction packets. (Block 625). In some examples, the branch detection circuitry 132 determines if any of the opcodes of the machine instructions from the packet construction circuitry 126 correspond to branch operations.

If the branch detection circuitry 132 determines there are branch instructions in the instruction packets (e.g., Block 625 returns a result of YES), the branch detection circuitry 132 selects a branch instruction of the branch instruction(s). (Block 630). In some examples, the branch detection circuitry 132 sequentially receives machine instructions from the instruction approximation circuitry 124. In such examples, the branch detection circuitry 132 sequentially processes the branch instructions from the instruction approximation circuitry 124.

The branch detection circuitry 132 determines if the branch instruction is conditional. (Block 635). In some examples, the branch detection circuitry 132 determines if the opcode of the branch instruction corresponds to a conditional operation. For example, whether or not the branch is taken depends on a flag set by a previous machine instruction. When the branch instruction is dependent on operations of a previous machine instruction, the branch detection circuitry 132 determines the branch instruction to be conditional.

If the branch detection circuitry 132 determines that the branch instruction is conditional (e.g., Block 635 returns a result of YES), the flag check circuitry 136 of FIG. 1 determines which flag(s) correspond to the condition. (Block 640). In some examples, the branch detection circuitry 132 uses the opcode of the machine instruction to determine which flag(s) are checked responsive to the conditional branch instruction. In such examples, the flags identify an outcome of a previous operation.

The flag check circuitry 136 determines if any of a reference number of instruction packets that are prior to the branch instruction are capable of adjusting the flag(s). (Block 645). In some examples, the flag check circuitry 136 access the instruction packets of the instruction buffer circuitry 144 of FIG. 1. In such examples, the flag check circuitry 136 uses the opcodes of machine instructions of the instruction packets to determine whether a reference number of instruction packets that execute prior to the branch instruction are capable of adjusting any flags that are checked by the condition of the branch instruction.

If the flag check circuitry 136 determines that one or more of the prior three machine instructions are capable of adjusting the flag(s) (e.g., Block 645 returns a result of YES), the flag check circuitry 136 adds no operation (NoOp) instruction packet(s) after the determined instruction. (Block 650). In some examples, the flag check circuitry 136 adds one or more no operation instruction packets after the determined instruction, which is capable of adjusting a flag, in the instruction buffer circuitry 144. In such examples, the flag check circuitry 136 adds the one or more no operation instruction packets to ensure that a reference number of instruction packets, which do not adjust the flags checked by the conditional branch instruction, are to be executed following the conditional branch instruction. Advantageously, the flag check circuitry 136 ensures that the branch instruction may be reordered by the reference number of instruction packets without impacting conditional operations of a branch operation.

If the branch detection circuitry 132 determines the branch instruction is an unconditional branch instruction (e.g., Block 635 returns a result of NO), the flag check circuitry 136 determines that none of the reference number of instruction packets prior to the original location of the conditional branch instruction are capable of adjusting flag(s) of the conditional branch instruction (e.g., Block 635 returns a result of NO), or control proceeds from Block 650, the branch relocation circuitry 140 of FIG. 1 reorders the branch instruction to execute before the reference number of instruction packets immediately prior to the branch instruction. (Block 655). In some examples, the branch relocation circuitry 140 reorders the branch instruction prior to the reference number of instructions immediately prior to an original location of the branch instruction, which may include one or more no operation instruction packets, in the instruction buffer circuitry 144. For example, the branch relocation circuitry 140 may reorder the branch instruction packet and three prior instructions, which includes any no operation instruction packets, to adjust the order of execution of the instruction packets. Advantageously, the programmable circuitry 205 preemptively reorders the branch instruction packet to begin to execute prior to the reference number of instruction packets responsive to adjusting the order of the branch instruction.

The branch detection circuitry 132 determines if there are more branch instructions in the instruction packets. (Block 660). In some examples, the branch detection circuitry 132 continues to check opcodes of the machine instructions from the instruction approximation circuitry 124 to determine whether a machine instruction is a branch instruction. If the branch detection circuitry 132 determines that not all branch instructions of the instruction packets have been checked (e.g., Block 660 returns a result of YES), control proceeds to return to Block 630.

If the branch detection circuitry 132 determines there are no branch instructions in the instruction packets (e.g., Block 625 returns a result of NO) or the branch detection circuitry 132 determines that all branch instructions of the instruction packets have been checked (e.g., Block 660 returns a result of NO), the memory write circuitry 148 of FIG. 1 writes the instruction packets to memory. (Operations 665). Example operations of the memory write circuitry 148 are illustrated and further described in connection with FIG. 7, below. Control proceeds to end.

Although example methods are described with reference to the flowchart illustrated in FIG. 6, many other methods of implementing the compiler circuitry 108 may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 7:
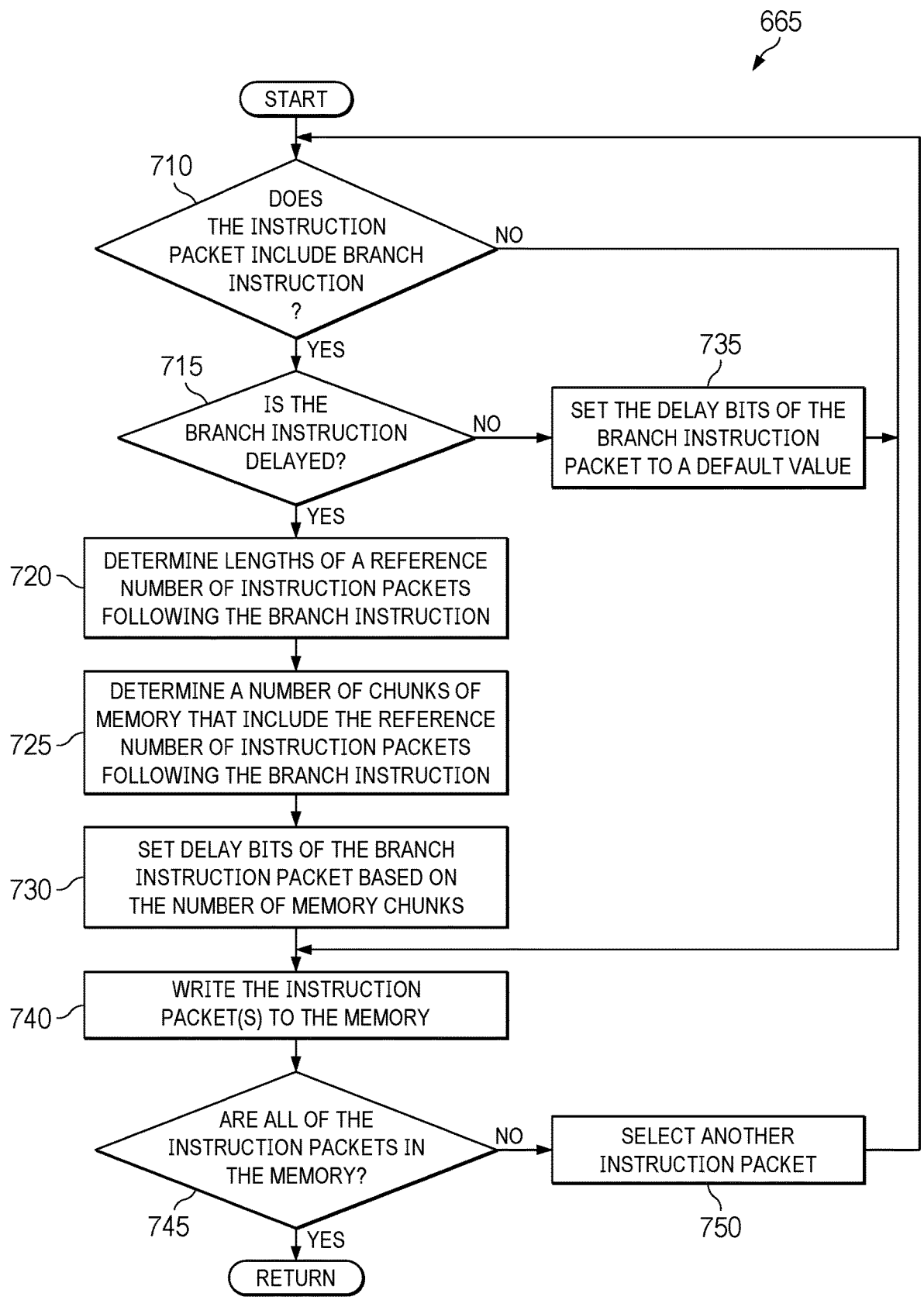
FIG. 7 is a flowchart representative of example machine-readable instructions and/or example operations that may be executed, instantiated, and/or performed using an example programmable circuitry implementation of the compiler circuitry of FIG. 1 to place the list of machine-readable instructions of FIG. 6 in memory.

FIG. 7 is a flowchart representative of example machine-readable instructions and/or example operations 665 of FIG.

6 that may be executed, instantiated, and/or performed using an example programmable circuitry implementation of the memory write circuitry 148 of FIG. 1 and/or more generally the compiler circuitry 108 of FIG. 1 to place the list of machine-readable instructions of FIG. 6 in memory (e.g., the memory 168, 330, 418 of FIGS. 1, 2, 3, and/or 4).

The example operations 665 begin at Block 710, at which, the packet manager circuitry 152 of FIG. 1 determines if the instruction packet includes a branch instruction. (Block 710). In some examples, the packet manager circuitry 152 uses the opcode of a machine instruction of an instruction packet to determine if the operation of the machine instruction corresponds to a branch operation.

If the packet manager circuitry 152 determines the machine instruction of the instruction packet includes a branch instruction (e.g., Block 710 returns a result of YES), the branch packet controller circuitry 156 determines if the branch instruction is a delayed branch instruction. (Block 715). In some examples, the branch packet controller circuitry 156 determines if the delay bits (e.g., the delay bits 540 of FIG. 5) identify the branch operation as one of a non-delayed branch instruction or a single chunk of memory read. For example, when the delay bits are a default value, the reference number of instruction packets following the branch instruction are already stored in one of the instruction buffer circuitry 215, 220. In such examples, the reference number of instruction packets following the branch instruction may not already stored in one of the instruction buffer circuitry 215, 220. However, a read command corresponding to the single chunk may have already been sent to memory. In such examples, the reference number of instruction packets following the branch instruction will be stored in one of the instruction buffer circuitry 215, 220 after the current cycle. In other examples, when the delay bits are a default value, the programmable circuitry 205 halts execution of instructions until a time where the branch instructions may be executed.

If the branch packet controller circuitry 156 determines the branch instruction is a conditional branch instruction (e.g., Block 715 returns a result of YES), the packet manager circuitry 152 determines lengths of a reference number of instruction packets following the branch instruction. (Block 720). In some examples, the branch packet controller circuitry 156 stores the branch instruction packet in the memory chunk buffer circuitry 164 of FIG. 1 and supplies the address of the branch instruction packet to the delay encoder circuitry 160 of FIG. 1. In such examples, the packet manager circuitry 152 determines lengths of the reference number of instruction packets following the branch instruction packet responsive to a difference between the stored address and the address following an addition of the reference number of instruction packets. The packet manager circuitry 152 stores the determined instruction packets in the memory chunk buffer circuitry 164 after the branch instruction packet.

The delay encoder circuitry 160 determines a number of memory chunks that include the branch instruction packet and the reference number of instruction packets following the branch instruction. (Block 725). In some examples, the delay encoder circuitry 160 determines the number of memory chunks that contain the branch instruction packet, and the reference number of instruction packets following the branch instruction packet responsive to the start address of the branch instruction packet and the end address of the reference number of instruction packets. In such examples, the delay encoder circuitry 160 determines a number of chunks of memory that include the determined addresses.

The delay encoder circuitry 160 sets delay bits of the branch instruction packet based on the number of memory chunks. (Block 730). In some examples, the delay encoder circuitry 160 sets the delay bits to one of four states based on the determined number of memory chunks that include the branch instruction packet and the three following instruction packets. In such examples, the state of the delay bits represents the number of memory chunks to be fetched prior to fetching instructions at an address specified by the branch instruction. Advantageously, the delay bits ensure that the programmable circuitry 205 fetches the three following instruction packets prior to fetching instructions for the branch instruction.

If the branch packet controller circuitry 156 determines the branch instruction is not a delayed branch instruction (e.g., Block 715 returns a result of NO), the delay encoder circuitry 160 sets the delay bits of the branch instruction packet to a default value. (Block 735). In some examples, the delay encoder circuitry 160 does not adjust the delay bits of a branch instruction responsive to a determination that the branch instruction is a conditional branch.

If the packet manager circuitry 152 determines the machine instruction of an instruction packet does not include a branch instruction (e.g., Block 710 returns a result of NO) or control proceeds from Blocks 730, 735, the memory chunk buffer circuitry 164 writes the instruction packet(s) to the memory. (Block 740). In some examples, the memory chunk buffer circuitry 164 writes the instruction packets 176, 180 of FIG. 1 to the first memory chunk 172 of FIG. 1.

The packet manager circuitry 152 determines if all of the instruction packets are in the memory. (Block 745). In some examples, the packet manager circuitry 152 determines all of the instruction packets are in the memory 168 responsive to the instruction buffer circuitry 144 being empty. If the packet manager circuitry 152 determines that all of the instruction packets are in the memory (e.g., Block 745 returns a result of YES), control proceeds to return.

If the packet manager circuitry 152 determines that not all of the instruction packets are in the memory (e.g., Block 745 returns a result of NO), the packet manager circuitry 152 selects another instruction packet. (Block 750). Control proceeds to return to Block 710.

Although example methods are described with reference to the flowchart illustrated in FIG. 7, many other methods of implementing the memory write circuitry 148 may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 8A:
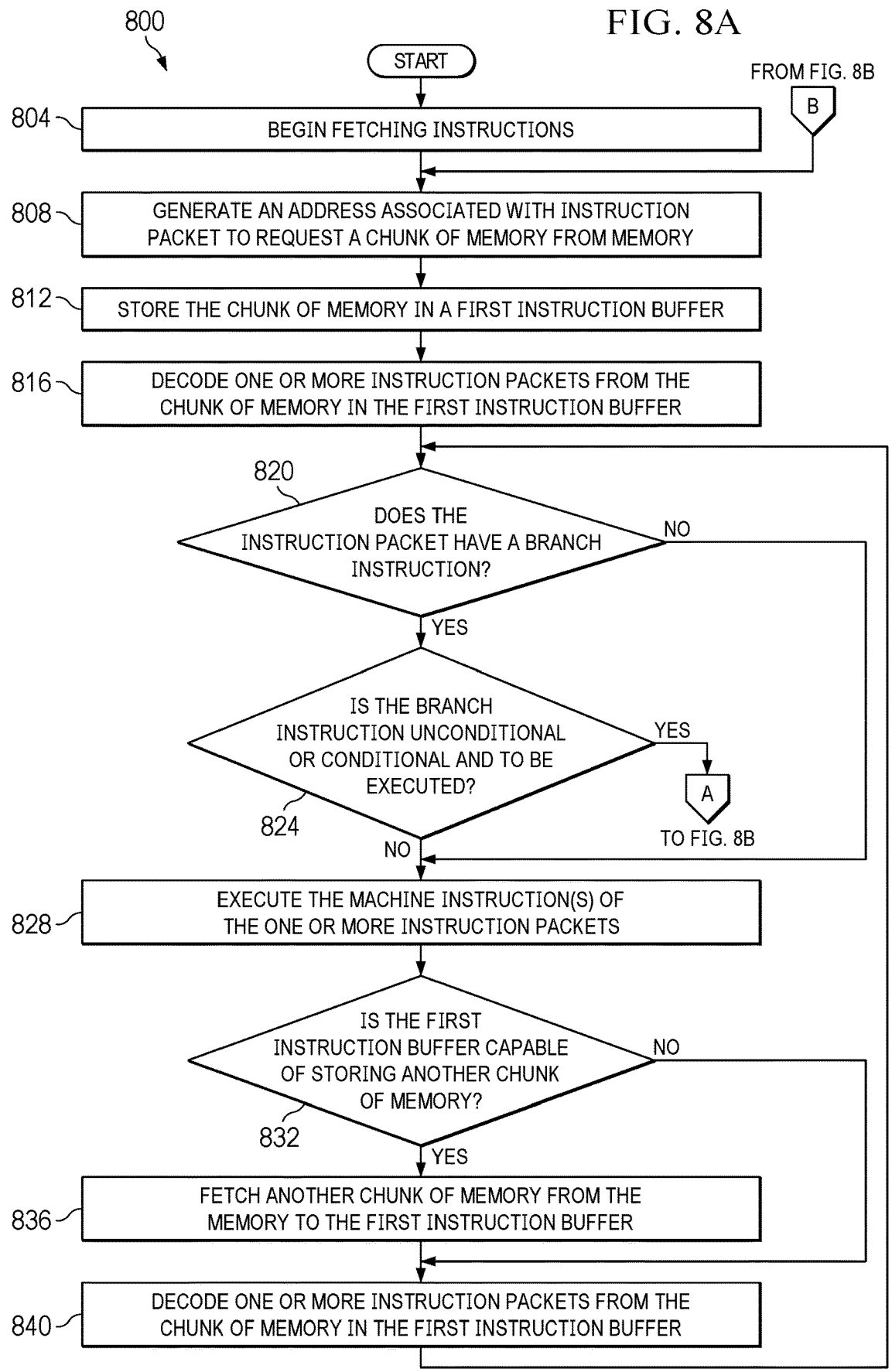
FIGS. 8A and 8B form a flowchart representative of example machine-readable instructions and/or example operations that may be executed, instantiated, and/or performed using an example implementation of the programmable circuitry of FIG. 2.
Figure 8B:
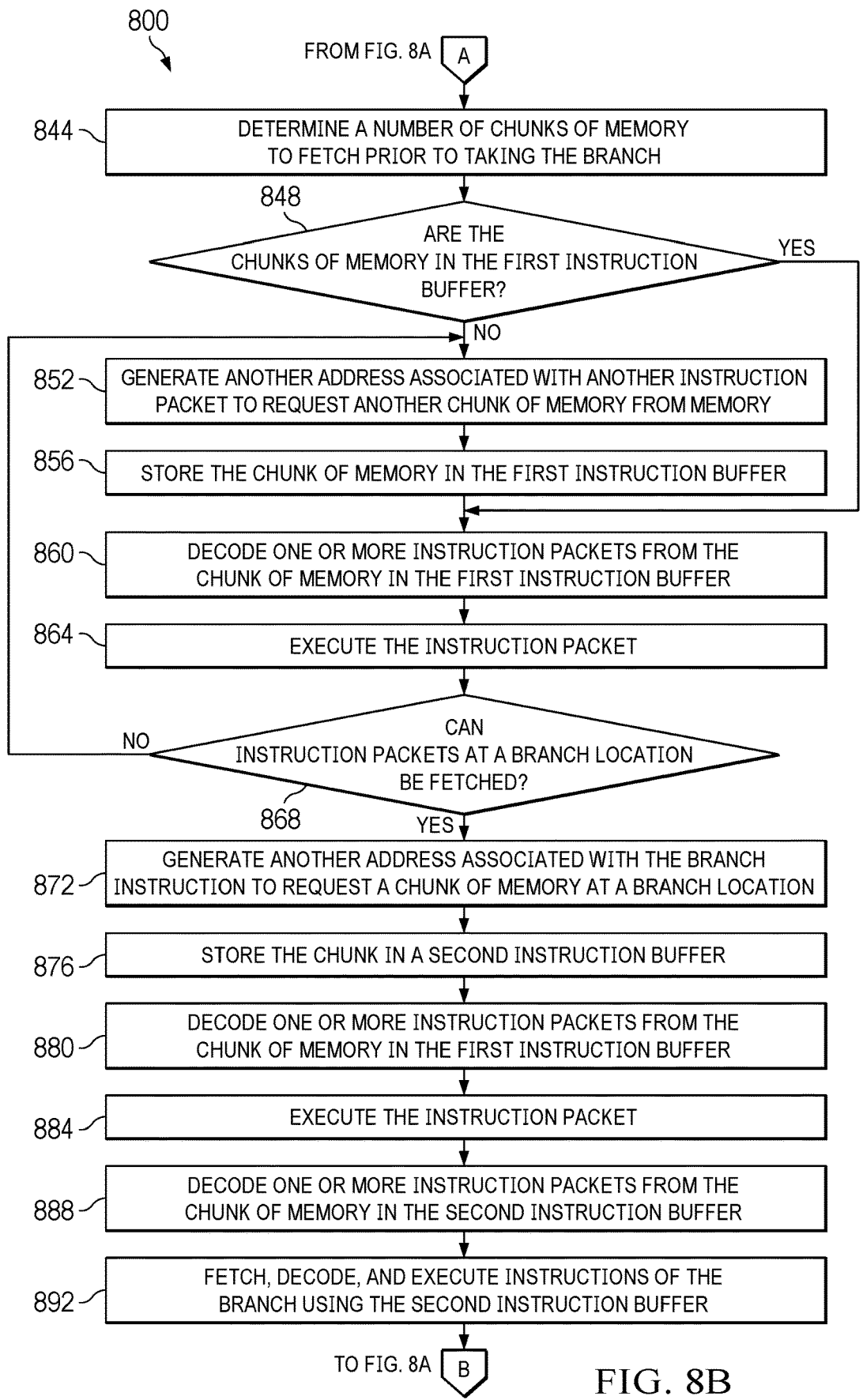

FIGS. 8A and 8B form a flowchart representative of example machine-readable instructions and/or example operations 800 that may be executed, instantiated, and/or performed using an example implementation of the programmable circuitry 205 of FIG. 2. The example operations 800 begin at Block 804, at which, the address generation circuitry 250 of FIG. 2 begins fetching instructions. In some examples, the address generation circuitry 250 checks the buffer controller circuitry 255 of FIG. 2 to determine if the one of the instruction buffer circuitry 215, 220 of FIG. 2 are capable of storing a memory chunk. In such examples, the address generation circuitry 250 detects the memory chunks 172, 184, 192 of FIGS. 1 and 2 contain instruction packets.

The address generation circuitry 250 generates an address associated with an instruction packet to request a memory chunk from memory. (Block 808). In some examples, the address generation circuitry 250 generates a read command including a memory address of one of the memory chunks 172, 184, 192. In such examples, the address generation circuitry 250 requests the one of the memory chunks 172, 184, 192 responsive to supplying the read command to the memory 168 of FIG. 1.

The memory 168 stores the memory chunk in a first instruction buffer. (Block 812). In some examples, the buffer controller circuitry 255 configures the demultiplexer circuitry 210 to couple the first instruction buffer circuitry 215 of FIG. 2 to the memory 168. In such examples, the memory 168 provides the one of the memory chunks 172, 184, 192 to the first instruction buffer circuitry 215 responsive to the read command.

The decoder circuitry 235 of FIG. 2 decodes one or more instruction packets from the memory chunk in the first instruction buffer. (Block 816). In some examples, the buffer controller circuitry 255 configures the multiplexer circuitry 225 of FIG. 2 to couple the first instruction buffer circuitry 215 to the decoder circuitry 235. In such examples, the decoder circuitry 235 decodes the one of the memory chunks 172, 184, 192 to determine one of the instruction packets 176, 180, 188, 196 of FIGS. 1 and 2.

The execution circuitry 240 of FIG. 2 determines if the instruction packet has a branch instruction. (Block 820). In some examples, the execution circuitry 240 uses the opcode of the machine instruction of the one of the instruction packets 176, 180, 188, 196 to determine if the operation of the machine instruction corresponds to a branch operation.

If the execution circuitry 240 determines that the instruction packet does have a branch instruction (e.g., Block 820 returns a result of YES), the execution circuitry 240 determines if the branch instruction is unconditional or both conditional and to be taken. (Block 824). In some examples, the execution circuitry 240 determines whether to instantiate the discontinuity controller circuitry 245 of FIG. 2. In such examples, the execution circuitry 240 instantiates the discontinuity controller circuitry 245 responsive to performing a branch operation.

If the execution circuitry 240 determines that the instruction packet does not have a branch instruction (e.g., Block 820 returns a result of NO) or the execution circuitry 240 determines that the branch instruction in a conditional instruction that is not executed (e.g., Block 824 returns a result of NO), the execution circuitry 240 executes machine instruction(s) of the one or more instruction packets. (Block 828). In some examples, the execution circuitry 240 instantiates circuitry to perform an operation of the machine instruction. In such examples, the opcode of the machine instruction adjusts the execution circuitry 240 to instantiate the circuitry, while the operand configures inputs and/or outputs of the instantiated circuitry. For example, the operands may specify a location of input data and/or a location to store an output.

The address generation circuitry 250 determines if the first instruction buffer is full. (Block 832). In some examples, the buffer controller circuitry 255 determines whether the first instruction buffer circuitry 215 is capable of storing an additional one of the memory chunks 172, 184, 192. In such examples, the address generation circuitry 250 receives an indication from the buffer controller circuitry 255 specifying whether the first instruction buffer circuitry 215 is full.

If the address generation circuitry 250 determines that the first instruction buffer is not full (e.g., Block 832 returns a result of YES), the address generation circuitry 250 fetches another memory chunk from the memory to the first instruction buffer. (Block 836). In some examples, the address generation circuitry 250 supplies another read command, having an address of another one of the memory chunks 172, 184, 192, to the memory 168. In such examples, the memory 168 stores the another one of the memory chunks 172, 184, 192 in the first instruction buffer circuitry 215.

If the address generation circuitry 250 determines that the first instruction buffer is full (e.g., Block 832 returns a result of NO) or control proceeds from Block 836, the decoder circuitry 235 decodes one or more instruction packets from the memory chunks in the first instruction buffer. (Block 840). In some examples, the decoder circuitry 235 decodes the another one of the memory chunks 172, 184, 192 to determine another one of the instruction packets 176, 180, 188, 196. Control proceeds to return to Block 820.

Turning now to FIG. 8B, if the execution circuitry 240 determines that the branch instruction in an unconditional instruction or is a conditional instruction that is taken (e.g., Block 824 returns a result of YES), the discontinuity controller circuitry 245 of FIG. 2 determines a number of memory chunks to fetch prior to taking the branch. (Block 844). In some examples, the execution circuitry 240 instantiates the discontinuity controller circuitry 245 responsive to a branch instruction from the decoder circuitry 235. In such examples, the discontinuity controller circuitry 245 determines a number of memory chunks to fetch prior to fetching from a branch location responsive to the delay bits. For example, a first state (e.g., 0x0) of the delay bits corresponds to fetching one of the memory chunks 172, 184, 192, while a second state (e.g., 0x1) of the delay bits corresponds to fetching two of the memory chunks 172, 184, 192.

The discontinuity controller circuitry 245 determines if the memory chunks are in the first instruction buffer. (Block 848). In some examples, the buffer controller circuitry 255 identifies which of the memory chunks 172, 184, 192 are in the first instruction buffer circuitry 215. In other examples, the buffer controller circuitry 255 identifies a number of the memory chunks 172, 184, 192 that are stored in the first instruction buffer circuitry 215. In both examples, the discontinuity controller circuitry 245 determines if the determined number of memory chunks are in the first instruction buffer circuitry 215.

If the discontinuity controller circuitry 245 determines that the memory chunks are not in the first instruction buffer (e.g., Block 848 returns a result of NO), the address generation circuitry 250 generates another address associated with another instruction packet to request another memory chunk from the memory. (Block 852). In some examples, the address generation circuitry 250 generates a read command including a memory address of one of the memory chunks 172, 184, 192. In such examples, the address generation circuitry 250 requests the one of the memory chunks 172, 184, 192 responsive to supplying the read command to the memory 168.

The memory 168 stores the memory chunk in the first instruction buffer. (Block 856). In some examples, the memory 168 provides the one of the memory chunks 172, 184, 192 to the first instruction buffer circuitry 215 responsive to the read command.

If the discontinuity controller circuitry 245 determines that the memory chunks are in the first instruction buffer (e.g., Block 848 returns a result of YES) or control proceeds from Block 856, the decoder circuitry 235 decodes one or more instruction packets from the memory chunks in the first instruction buffer to determine another instruction packet. (Block 860). In some examples, the decoder circuitry 235 decodes the one of the memory chunks 172, 184, 192 to determine one of the instruction packets 176, 180, 188, 196.

The execution circuitry 240 executes the machine instruction of the instruction packet. (Block 864). In some examples, the execution circuitry 240 instantiates circuitry to perform an operation of the machine instruction. In such examples, the opcode of the machine instruction adjusts the execution circuitry 240 to instantiate the circuitry, while the operand configures inputs and/or outputs of the instantiated circuitry.

The discontinuity controller circuitry 245 determines if instruction packets at a branch location can begin to be fetched. (Block 868). In some examples, the buffer controller circuitry 255 identifies which of the memory chunks 172, 184, 192 are in the first instruction buffer circuitry 215. In other examples, the buffer controller circuitry 255 identifies a number of the memory chunks 172, 184, 192 that are stored in the first instruction buffer circuitry 215. In both examples, the discontinuity controller circuitry 245 determines if the determined number of memory chunks are in the first instruction buffer circuitry 215. For example, the discontinuity controller circuitry 245 determines that the number of memory chunks in the first instruction buffer circuitry 215 contain the needed instruction packets responsive to one of the fields of the branch instruction. In such an example, the branch instruction may have a first field, which contains the opcode, and a second field, which contains the location of the branch. If the discontinuity controller circuitry 245 determines that more memory chunks are needed to continue to execute from the first instruction buffer (e.g., Block 868 returns a result of NO), control proceeds to return to Block 852.

If the discontinuity controller circuitry 245 determines that the memory chunks needed to continue to execute from the first instruction buffer are in the first instruction buffer (e.g., Block 868 returns a result of YES), the address generation circuitry 250 generates another address associated with the branch instruction to request a memory chunk at the branch location. (Block 872). In some examples, the address generation circuitry 250 generates a read command including a branch target address from the discontinuity controller circuitry 245. In such examples, the address generation circuitry 250 requests the one of the memory chunks 172, 184, 192 at the branch target address responsive to supplying the read command to the memory 168.

The memory 168 stores the memory chunk in a second instruction buffer. (Block 876). In some examples, the buffer controller circuitry 255 configures the demultiplexer circuitry 210 to couple the second instruction buffer circuitry 220 of FIG. 2 to the memory 168. In such examples, the memory 168 provides the one of the memory chunks 172, 184, 192 to the second instruction buffer circuitry 220 responsive to the read command.

The decoder circuitry 235 decodes one or more instruction packets from the memory chunks in the first instruction buffer. (Block 880). In some examples, the decoder circuitry 235 decodes the one of the memory chunks 172, 184, 192 to determine another one of the instruction packets 176, 180, 188, 196.

The execution circuitry 240 executes the machine instruction of the instruction packet. (Block 884). In some examples, the execution circuitry 240 instantiates circuitry to perform an operation of the machine instruction. In such examples, the opcode of the machine instruction adjusts the execution circuitry 240 to instantiate the circuitry, while the operand configures inputs and/or outputs of the instantiated circuitry. In some examples, the execution circuitry 240 determines to complete execution of the branch instruction responsive to the decoder circuitry 235 decoding a final one of the reference number of instruction packets that follow the branch instruction. For example, the execution circuitry 240 receives a final instruction that the decoder circuitry 235 has decoded from the first instruction buffer circuitry 215 prior to decoding instruction packets from the second instruction buffer circuitry 220. Such an example operation occurs during the ninth cycle 368 of FIG. 3C.

The decoder circuitry 235 of FIG. 2 decodes one or more instruction packets from the memory chunk in the second instruction buffer. (Block 888). In some examples, the buffer controller circuitry 255 configures the multiplexer circuitry 225 to couple the second instruction buffer circuitry 220 to the decoder circuitry 235. In such examples, the decoder circuitry 235 decodes the one of the memory chunks 172, 184, 192 to determine one of the instruction packets 176, 180, 188, 196.

The programmable circuitry 205 continues to fetch, decode, and execute instructions of the branch using the second instruction buffer. (Block 892). In some examples, the programmable circuitry 205 performs the operations of Blocks 808, 812, 816, 820, 824, 828, 832, 836, 840 using the second instruction buffer circuitry 220. In such examples, the programmable circuitry 205 may reperform the operations of Blocks 844, 848, 852, 856, 860, 864, 868, 872, 876, 880, 884, 888 responsive to another branch instruction. Control proceeds to return to Block 808.

Although example methods are described with reference to the flowchart illustrated in FIGS. 8A and 8B, many other methods of implementing the programmable circuitry 205 may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

While an example manner of implementing the compiler circuitry 108 of FIG. 1 and/or the programmable circuitry 205 of FIG. 2 is illustrated in FIGS. 1 and/or 2, one or more of the elements, processes, and/or devices illustrated in FIGS. 1 and/or 2 may be combined, divided, re-arranged, omitted, eliminated, and/or implemented in any other way. Further, the operation determination circuitry 112, the instruction approximation circuitry 124, the branch sequencing circuitry 128, the branch detection circuitry 132, the flag check circuitry 136, the branch relocation circuitry 140, the instruction buffer circuitry 144, the memory write circuitry 148, the packet manager circuitry 152, the branch packet controller circuitry 156, the delay encoder circuitry 160, the memory chunk buffer circuitry 164, and/or more generally the compiler circuitry 108 of FIG. 1, the discontinuity controller circuitry 245, the buffer controller circuitry 255, the address generation circuitry 250, and/or more generally the programmable circuitry 205 of FIG. 2, may be implemented by hardware alone or by hardware in combination with software and/or firmware. Thus, for example, any of the operation determination circuitry 112, the instruction approximation circuitry 124, the branch sequencing circuitry 128, the branch detection circuitry 132, the flag check circuitry 136, the branch relocation circuitry 140, the instruction buffer circuitry 144, the memory write circuitry 148, the packet manager circuitry 152, the branch packet controller circuitry 156, the delay encoder circuitry 160, the memory chunk buffer circuitry 164, and/or more generally the compiler circuitry 108 of FIG. 1, the discontinuity controller circuitry 245, the buffer controller circuitry 255, the address generation circuitry 250, and/or more generally the programmable circuitry 205 of FIG. 2, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the compiler circuitry 108 of FIG. 1 and/or the programmable circuitry 205 of FIG. 2 is illustrated in FIGS. 1 and/or 2 may include one or more elements, processes, and/or devices in addition to, or instead of, those illustrated in FIGS. 1 and/or 2, and/or may include more than one of any or all of the illustrated elements, processes and devices.

Flowchart(s) representative of example machine-readable instructions, which may be executed by programmable circuitry to implement and/or instantiate the compiler circuitry 108 of FIG. 1 and/or the programmable circuitry 205 of FIG. 2 is illustrated in FIGS. 1 and/or 2 and/or representative of example operations which may be performed by programmable circuitry to implement and/or instantiate the compiler circuitry 108 of FIG. 1 and/or the programmable circuitry 205 of FIG. 2 is illustrated in FIGS. 1 and/or 2, are shown in FIGS. 6, 7, 8A, and 8B. The machine-readable instructions may be one or more executable programs or portion(s) of one or more executable programs for execution by programmable circuitry such as the programmable circuitry 912 shown in the example processor platform 900 discussed below in connection with FIG. 9 and/or may be one or more function(s) or portion(s) of functions to be performed by the example programmable circuitry (e.g., an FPGA) discussed below in connection with FIGS. 9 and/or 10. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 6, 7, 8A, and/or 8B, many other methods of implementing the compiler circuitry 108 of FIG. 1 and/or the programmable circuitry 205 of FIG. 2 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, machine-readable, computer readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6, 7, 8A, and/or 8B may be implemented using executable instructions (e.g., computer readable and/or machine-readable instructions) stored on one or more non-transitory computer readable and/or machine-readable media. As used herein, the terms non-transitory computer readable medium, non-transitory computer readable storage medium, non-transitory machine-readable medium, and/or non-transitory machine-readable storage medium are expressly defined to include any type of computer readable storage device and/or storage disk and to exclude propagating signals and to exclude transmission media. Examples of such non-transitory computer readable medium, non-transitory computer readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine-readable instructions, etc., and/or manufactured to execute computer-readable instructions, machine-readable instructions, etc.

Figure 9:
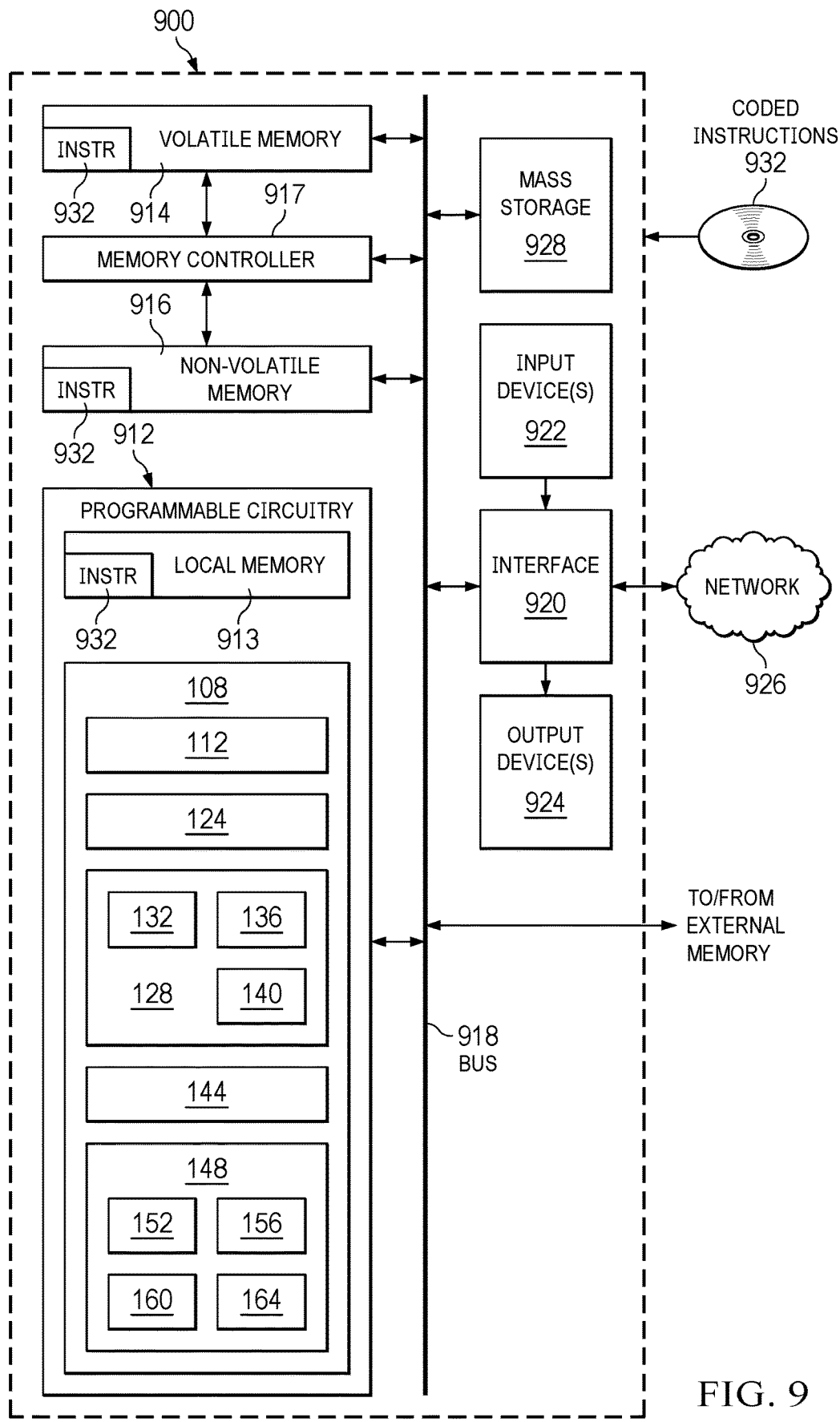
FIG. 9 is a block diagram of an example processing platform including programmable circuitry structured to execute, instantiate, and/or perform the example machine-readable instructions and/or perform the example operations of FIGS. 6, 7, 8A, and/or 8B to implement the compiler circuitry of FIG. 1 and/or the programmable circuitry of FIG. 2.

FIG. 9 is a block diagram of an example programmable circuitry platform 900 structured to execute and/or instantiate the example machine-readable instructions and/or the example operations of FIGS. 6, 7, 8A, and/or 8B to implement the compiler circuitry 108 of FIG. 1 and/or the programmable circuitry 205 of FIG. 2. The programmable circuitry platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 900 of the illustrated example includes programmable circuitry 912. The programmable circuitry 912 of the illustrated example is hardware. For example, the programmable circuitry 912 can be implemented by one or more integrated circuits, logic circuits, FPGAs, microprocessors, CPUs, GPUs, DSPs, and/or microcontrollers from any desired family or manufacturer. The programmable circuitry 912 may be implemented by one or more semiconductor based (e.g., silicon based) devices. In this example, the programmable circuitry 912 implements the operation determination circuitry 112, the instruction approximation circuitry 124, the branch sequencing circuitry 128, the branch detection circuitry 132, the flag check circuitry 136, the branch relocation circuitry 140, the instruction buffer circuitry 144, the memory write circuitry 148, the packet manager circuitry 152, the branch packet controller circuitry 156, the delay encoder circuitry 160, the memory chunk buffer circuitry 164, and/or more generally the compiler circuitry 108 of FIG. 1, the discontinuity controller circuitry 245, the buffer controller circuitry 255, the address generation circuitry 250, and/or more generally the programmable circuitry 205 of FIG. 2.

The programmable circuitry 912 of the illustrated example includes a local memory 913 (e.g., a cache, registers, etc.). The programmable circuitry 912 of the illustrated example is in communication with main memory 914, 916, which includes a volatile memory 914 and a non-volatile memory 916, by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917. In some examples, the memory controller 917 may be implemented by one or more integrated circuits, logic circuits, microcontrollers from any desired family or manufacturer, or any other type of circuitry to manage the flow of data going to and from the main memory 914, 916.

The programmable circuitry platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user (e.g., a human user, a machine user, etc.) to enter data and/or commands into the programmable circuitry 912. The input device(s) 922 can be implemented by, for example, an audio sensor, a microphone, a camera (still or video), a keyboard, a button, a mouse, a touchscreen, a trackpad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 900 of the illustrated example also includes one or more mass storage discs or devices 928 to store firmware, software, and/or data. Examples of such mass storage discs or devices 928 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 932, which may be implemented by the machine-readable instructions of FIGS. 6, 7, 8A, and/or 8B, may be stored in the mass storage device 928, in the volatile memory 914, in the non-volatile memory 916, and/or on at least one non-transitory computer readable storage medium such as a CD or DVD which may be removable.

Figure 10:
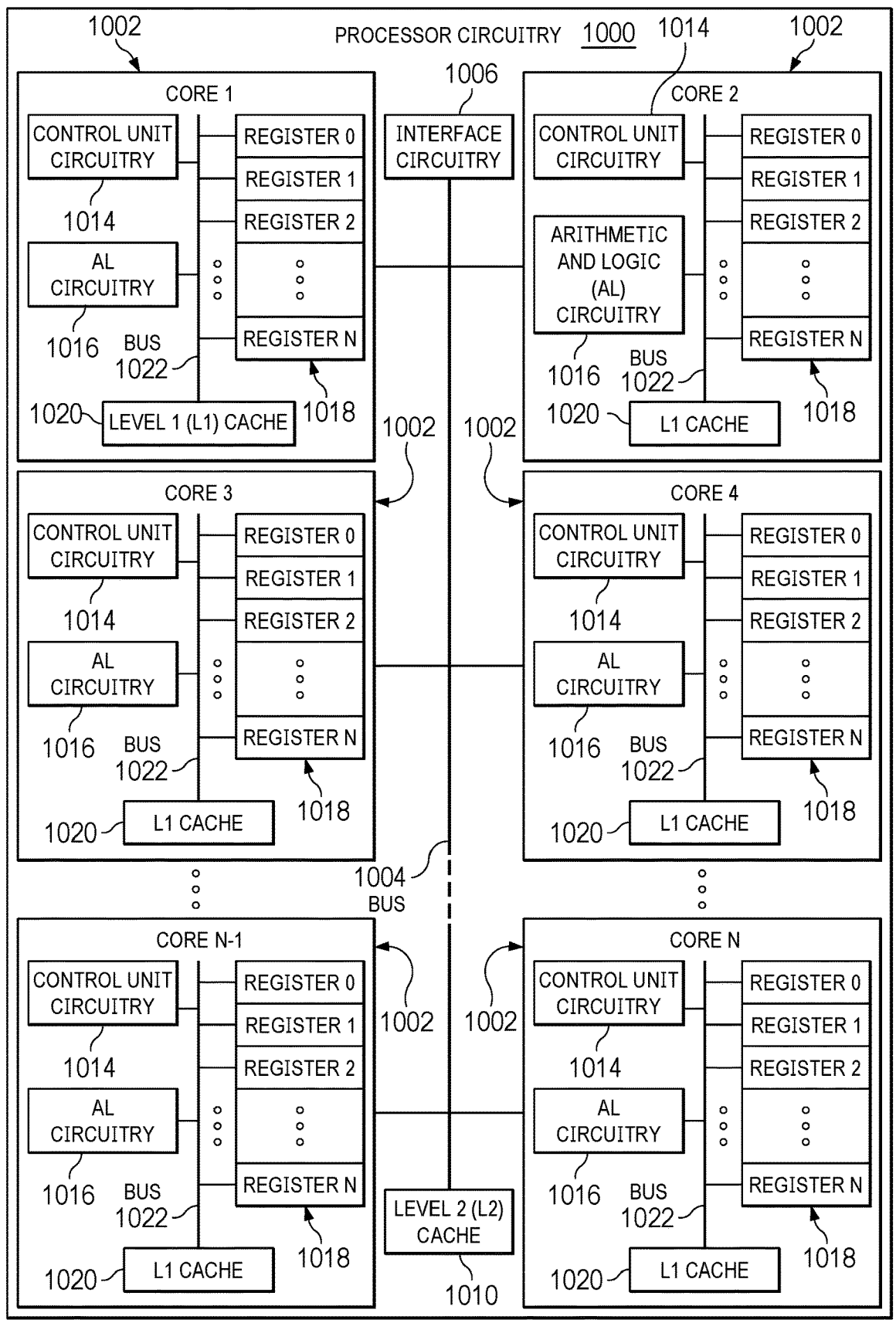
FIG. 10 is a block diagram of an example implementation of the programmable circuitry of FIG. 9.

FIG. 10 is a block diagram of an example implementation of the programmable circuitry 912 of FIG. 9. In this example, the programmable circuitry 912 of FIG. 9 is implemented by a microprocessor 1000. For example, the microprocessor 1000 may be a general-purpose microprocessor (e.g., general-purpose microprocessor circuitry). The microprocessor 1000 executes some or all of the machine-readable instructions of the flowcharts of FIGS. 6, 7, 8A, and/or 8B to effectively instantiate the circuitry of FIGS. 1 and/or 2 as logic circuits to perform operations corresponding to those machine-readable instructions. In some such examples, the compiler circuitry 108 of FIG. 1 and/or the programmable circuitry 205 of FIG. 2 is instantiated by the hardware circuits of the microprocessor 1000 in combination with the machine-readable instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine-readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002.

The software program may correspond to a portion or all of the machine-readable instructions and/or operations represented by the flowcharts of FIGS. 6, 7, 8A, and/or 8B.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer-based operations. In other examples, the AL circuitry 1016 also performs floating-point operations. In yet other examples, the AL circuitry 1016 may include first AL circuitry that performs integer-based operations and second AL circuitry that performs floating-point operations. In some examples, the AL circuitry 1016 may be referred to as an Arithmetic Logic Unit (ALU).

The registers 1018 are semiconductor-based structures to store data and/or instructions such as results of one or more of the operations performed by the AL circuitry 1016 of the corresponding core 1002. For example, the registers 1018 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1018 may be arranged in a bank as shown in FIG. 10.

Alternatively, the registers 1018 may be organized in any other arrangement, format, or structure, such as by being distributed throughout the core 1002 to shorten access time. The second bus 1022 may be implemented by at least one of an I2C bus, a SPI bus, a PCI bus, or a PCIe bus.

Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages.

The microprocessor 1000 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1000, in the same chip package as the microprocessor 1000 and/or in one or more separate packages from the microprocessor 1000.

Figure 11:
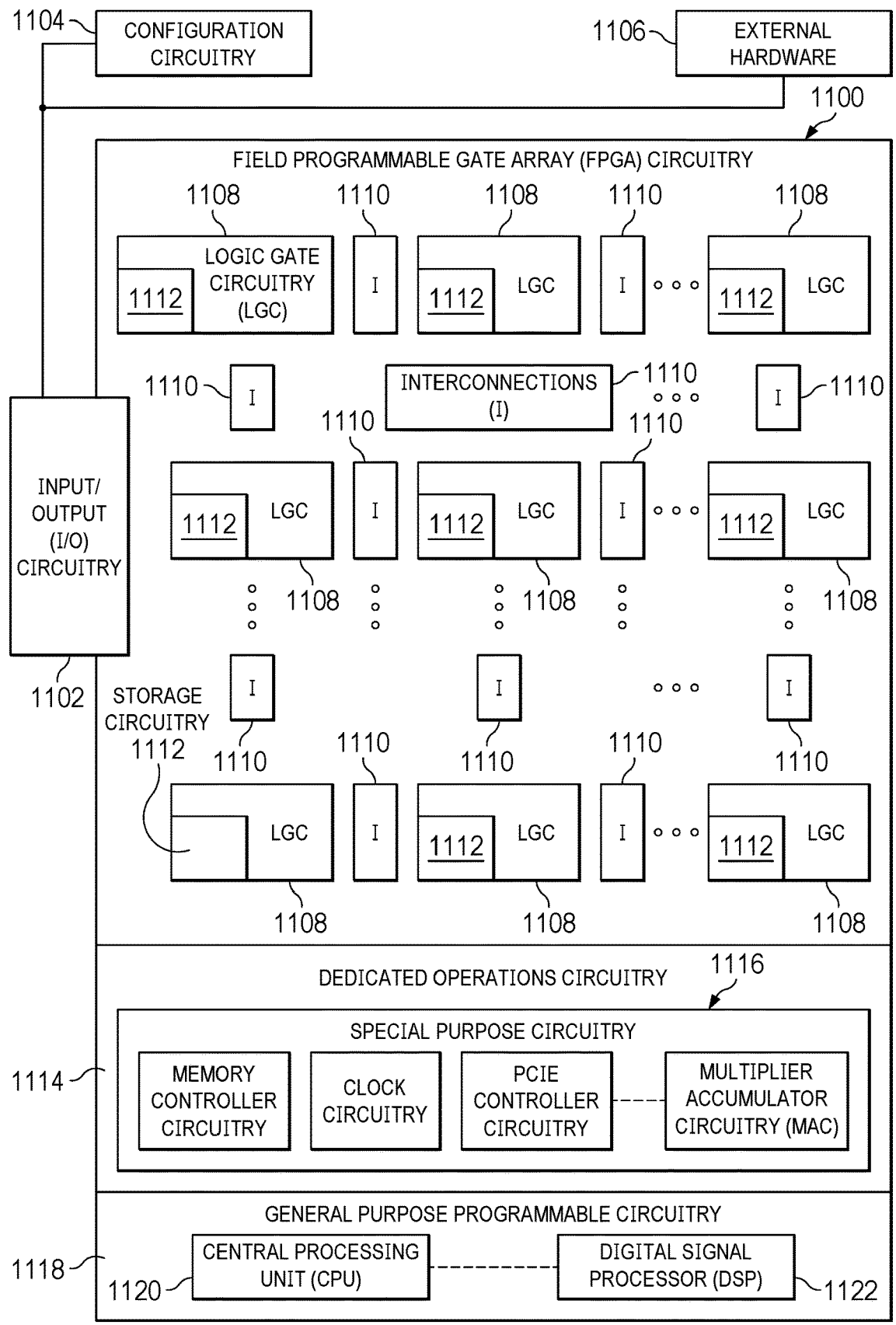
FIG. 11 is a block diagram of another example implementation of the programmable circuitry of FIG. 9.

FIG. 11 is a block diagram of another example implementation of the programmable circuitry 912 of FIG. 9. In this example, the programmable circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine-readable instructions. However, once configured, the FPGA circuitry 1100 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 1000 of FIG. 10 described above (which is a general purpose device that may be programmed to execute some or all of the machine-readable instructions represented by the flowchart(s) of FIGS. 6, 7, 8A, and/or 8B but whose interconnections and logic circuitry are fixed once fabricated), the FPGA circuitry 1100 of the example of FIG. 11 includes interconnections and logic circuitry that may be configured, structured, programmed, and/or interconnected in different ways after fabrication to instantiate, for example, some or all of the operations/functions corresponding to the machine-readable instructions represented by the flowchart(s) of FIGS. 6, 7, 8A, and/or 8B. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 6, 7, 8A, and/or 8B. As such, the FPGA circuitry 1100 may be configured and/or structured to effectively instantiate some or all of the operations/functions corresponding to the machine-readable instructions of the flowchart(s) of FIGS. 6, 7, 8A, and/or 8B as dedicated logic circuits to perform the operations/functions corresponding to those software instructions in a dedicated manner analogous to an ASIC. Therefore, the FPGA circuitry 1100 may perform the operations/functions corresponding to the some or all of the machine-readable instructions of FIGS. 6, 7, 8A, and/or 8B faster than the general-purpose microprocessor can execute the same.

In the example of FIG. 11, the FPGA circuitry 1100 is configured and/or structured in response to being programmed (and/or reprogrammed one or more times) based on a binary file. In some examples, the binary file may be compiled and/or generated based on instructions in a hardware description language (HDL) such as Lucid, Very High-Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language; and the code/program (e.g., the code/program in the low-level language) may be converted (e.g., by a compiler, a software application, etc.) into the binary file. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain a binary file, which may be implemented by a bit stream, data, and/or machine-readable instructions, to configure the FPGA circuitry 1100, or portion(s) thereof. In some such examples, the configuration circuitry 1104 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1106 may be implemented by external hardware circuitry. For example, the external hardware 1106 may be implemented by the microprocessor 1000 of FIG. 10.

The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations/functions that may correspond to at least some of the machine-readable instructions of FIGS. 6, 7, 8A, and/or 8B and/or other desired operations. The logic gate circuitry 1108 shown in FIG. 11 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations/functions. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example dedicated operations circuitry 1114. In this example, the dedicated operations circuitry 1114 includes special purpose circuitry 1116 that may be invoked to implement commonly used functions to avoid programming those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 9 and 10 illustrate two example implementations of the programmable circuitry 912 of FIG. 9, many other approaches are contemplated. For example, FPGA circuitry may include an on-board CPU, such as one or more of the example CPU 1120 of FIG. 11. Therefore, the programmable circuitry 912 of FIG. 9 may additionally be implemented by combining at least the example microprocessor 1000 of FIG. 10 and the example FPGA circuitry 1100 of FIG. 11. In some such hybrid examples, one or more cores 1002 of FIG. 10 may execute a first portion of the machine-readable instructions represented by the flowchart(s) of FIGS. 6, 7, 8A, and/or 8B to perform first operation(s)/function(s), the FPGA circuitry 1100 of FIG. 11 may be configured and/or structured to perform second operation(s)/function(s) corresponding to a second portion of the machine-readable instructions represented by the flowcharts of FIGS. 6, 7, 8A, and/or 8B, and/or an ASIC may be configured and/or structured to perform third operation(s)/function(s) corresponding to a third portion of the machine-readable instructions represented by the flowcharts of FIGS. 6, 7, 8A, and/or 8B.

It should be understood that some or all of the compiler circuitry 108 of FIG. 1 and/or the programmable circuitry 205 of FIG. 2 may, thus, be instantiated at the same or different times. For example, same and/or different portion(s) of the microprocessor 1000 of FIG. 10 may be programmed to execute portion(s) of machine-readable instructions at the same and/or different times. In some examples, same and/or different portion(s) of the FPGA circuitry 1100 of FIG. 11 may be configured and/or structured to perform operations/functions corresponding to portion(s) of machine-readable instructions at the same and/or different times.

In some examples, some or all of the compiler circuitry 108 of FIG. 1 and/or the programmable circuitry 205 of FIG. 2 may be instantiated, for example, in one or more threads executing concurrently and/or in series. For example, the microprocessor 1000 of FIG. 10 may execute machine-readable instructions in one or more threads executing concurrently and/or in series. In some examples, the FPGA circuitry 1100 of FIG. 11 may be configured and/or structured to carry out operations/functions concurrently and/or in series. Moreover, in some examples, some or all of the compiler circuitry 108 of FIG. 1 and/or the programmable circuitry 205 of FIG. 2 may be implemented within one or more virtual machines and/or containers executing on the microprocessor 1000 of FIG. 10.

In some examples, the programmable circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the programmable circuitry 912 of FIG. 9, which may be in one or more packages. For example, the XPU may include a CPU (e.g., the microprocessor 1000 of FIG. 10, the CPU 1120 of FIG. 11, etc.) in one package, a DSP (e.g., the DSP 1122 of FIG. 11) in another package, a GPU in yet another package, and an FPGA (e.g., the FPGA circuitry 1100 of FIG. 11) in still yet another package.

Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., ordered on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the described examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Numerical identifiers such as "first," "second," "third," etc. are used merely to distinguish between elements of substantially the same type in terms of structure and/or function. These identifiers, as used in the detailed description, do not necessarily align with those used in the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value, or, if the value is zero, a reasonable range of values around zero.

Modifications are possible in the described embodiments, and other embodiments are possible, within the scope of the claims.

What is claimed is:

1. An apparatus comprising:
    address generation circuitry configured to generate a first address associated with a first packet, a second address associated with a second packet, and a third address associated with a third packet, wherein:
        the first packet includes a branch instruction;
        the branch instruction includes a first field that specifies a branch target, and a second field that is different from the first field; and
        the third packet includes the branch target of the branch instruction;
    buffer circuitry configured to receive the first packet, the second packet, and the third packet;
    decoder circuitry coupled to the buffer circuitry, the decoder circuitry configured to decode the first packet, the second packet, and the third packet;
    discontinuity controller circuitry coupled to the buffer circuitry and the decoder circuitry and configured to determine whether to cause the address generation circuitry to generate the second address based on the second field of the branch instruction; and
    execution circuitry coupled to the decoder circuitry, the execution circuitry configured to determine whether to cause the address generation circuitry to generate the third address based on the branch instruction.

2. The apparatus of claim 1, wherein: the buffer circuitry is a first buffer circuitry;

the address generation circuitry is coupled to the execution circuitry and further configured to request a first memory chunk and a second memory chunk, the first memory chunk including at least one of the first packet, the second packet, or the third packet, the second memory chunk including a fourth packet;

the first buffer circuitry is configured to store the first memory chunk in the first buffer circuitry; and the apparatus further comprises second buffer circuitry configured to store the second memory chunk in the second buffer circuitry responsive to a generation of the third address based on the branch instruction.

3. The apparatus of claim 1, wherein the buffer circuitry is first buffer circuitry, the apparatus further comprising second buffer circuitry; and wherein the second field of the branch instruction is delay information, and the delay information specifies a number of memory chunks to store in the first buffer circuitry prior to storing memory chunks in the second buffer circuitry.

4. The apparatus of claim 3, wherein the second buffer circuitry is configured to store begin storing memory chunks responsive to an execution of one of a call instruction or a return instruction.

5. The apparatus of claim 1, wherein:
the buffer circuitry is a first buffer circuitry:
the apparatus further comprises second buffer circuitry; and
the decoder circuitry is further configured to clear the first buffer circuitry responsive to the decoder circuitry being configured to decode chunks of memory from the second buffer circuitry.

6. The apparatus of claim 1, wherein:
the buffer circuitry is first buffer circuitry;
the apparatus further comprises second buffer circuitry; and
the execution circuitry is further configured to adjust which one of the first buffer circuitry or the second buffer circuitry the decoder circuitry is configured to decode packets from.

7. An apparatus comprising:
first buffer circuitry;
second buffer circuitry;
decoder circuitry coupled to the first and second buffer circuitry, the decoder circuitry configured to decode instructions by decoding memory chunks from one of the first or second buffer circuitry; and
address generation circuitry configured to request a memory chunk,
wherein:
the first buffer circuitry is configured to store the memory chunk responsive to a non-branch instruction;
the second buffer circuitry is configured to store the memory chunk responsive to a branch instruction; and
the decoder circuitry is configured to clear at least one of the first or second buffer circuitry based on switching between the first and the second buffer circuitry from which the decoder circuitry is configured to decode the memory chunks.

8. The apparatus of claim 7, further comprising execution circuitry coupled to the decoder circuitry, the execution circuitry configured to:
execute the instructions decoded by the decoder circuitry.

9. The apparatus of claim 8, wherein the execution circuitry is further configured to control from which one of the first or second buffer circuitry the decoder circuitry is configured to decode the memory chunks.

10. The apparatus of claim 8, wherein the execution circuitry is further configured to delay adjusting which one of the first or second buffer circuitry the decoder circuitry is configured to decode the memory chunks from by a number of cycles of a cycle clock.

11. The apparatus of claim 7, wherein the branch instruction includes delay information specifying a number of memory chunks to store in the first buffer circuitry prior to storing memory chunks in the second buffer circuitry.

12. The apparatus of claim 7, wherein the second buffer circuitry is configured to store the memory chunk responsive to an execution of one of a call instruction or a return instruction.

13. At least one non-transitory computer readable storage medium comprising first instructions that, when executed, cause first programmable circuitry to at least:
select a branch instruction from a list of machine instructions;
determine a reference number of non-branch instructions of the list of machine instructions prior to the branch instruction; and
adjust an order of execution of the branch instruction in the list of machine instructions based on the reference number of non-branch instructions; and
store the list of machine instructions in a memory, the list of machine instructions configured to be executed by second programmable circuitry.

14. The at least one non-transitory computer readable storage medium of claim 13, wherein the first instructions are to cause the first programmable circuitry to determine if the branch instruction is one of a conditional branch instruction or an unconditional branch instruction.

15. The at least one non-transitory computer readable storage medium of claim 14, wherein the first instructions are to cause the first programmable circuitry to:
responsive to determining the branch instruction is a conditional branch instruction, determine a flag to be checked by the branch instruction; and
adjust the order of execution of the branch instruction in the list of machine instructions to follow any of the reference number of non-branch instructions that are capable of adjusting the flag.

16. The at least one non-transitory computer readable storage medium of claim 15, wherein the first instructions are to cause the first programmable circuitry to, responsive to at least one of the reference number of non-branch instructions adjusting the flag, add at least one no operation instruction following ones of the reference number of non-branch instructions that are capable of adjusting the flag.

17. The at least one non-transitory computer readable storage medium of claim 14, wherein the first instructions are to cause the first programmable circuitry to, responsive to determining the branch instruction is an unconditional branch instruction, adjust the order of execution of the branch instruction in the list of machine instructions to execute prior to the reference number of instructions.

18. The at least one non-transitory computer readable storage medium of claim 13, wherein the first instructions are to cause the first programmable circuitry to:
generate an instruction packet based on a machine instruction of the list of machine instructions; and
generate memory chunks including one or more portions of the instruction packet, a memory chunk being a portion of the memory.

19. The at least one non-transitory computer readable storage medium of claim 18, wherein the first instructions are to cause the first programmable circuitry to:
- select a branch instruction packet;
- determine a reference number of non-branch instructions packets following the branch instruction packet; and
- determine a number of memory chunks that include the reference number of non-branch instruction packets following the branch instruction packet.

20. The at least one non-transitory computer readable storage medium of claim 19, wherein the first instructions are to cause the first programmable circuitry to adjust delay bits of the branch instruction packet based on the number of memory chunks that include the reference number of non-branch instruction packets.

* * * * *